(12) United States Patent
Kayama et al.

(10) Patent No.: US 7,754,649 B2
(45) Date of Patent: Jul. 13, 2010

(54) STRUCTURE HAVING STRONG CONTACT WITH SOLID PARTICLES, SUBSTRATE HAVING STRONG CONTACT WITH SOLID PARTICLES, AND MANUFACTURING METHODS THEREOF

(75) Inventors: Tomoyuki Kayama, Nagoya (JP); Kouzi Banno, Nagoya (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 12/225,116

(22) PCT Filed: Mar. 27, 2007

(86) PCT No.: PCT/JP2007/056319
§ 371 (c)(1), (2), (4) Date: Sep. 15, 2008

(87) PCT Pub. No.: WO2007/116715
PCT Pub. Date: Oct. 18, 2007

(65) Prior Publication Data
US 2009/0105069 A1 Apr. 23, 2009

(30) Foreign Application Priority Data
Mar. 31, 2006 (JP) .............................. 2006-101086

(51) Int. Cl.
*B01J 23/00* (2006.01)
(52) U.S. Cl. ...................................... 502/300; 502/237
(58) Field of Classification Search ................. 502/300, 502/237
See application file for complete search history.

(56) References Cited

U.S. PATENT DOCUMENTS 6,326,329 B1 * 12/2001 Nunan ......................... 502/242
6,399,528 B1 * 6/2002 Krell et al. .................... 501/80
2003/0092567 A1 5/2003 Tanaka et al.
2004/0018939 A1 1/2004 Chigapov et al.
2004/0234439 A1 11/2004 Takeshima et al.

FOREIGN PATENT DOCUMENTS

| JP | A 7-300315 | 11/1995 |
|---|---|---|
| JP | A 10-45412 | 2/1998 |
| JP | A 10-182155 | 7/1998 |
| JP | A 10-202102 | 8/1998 |
| JP | A 2000-281342 | 10/2000 |
| JP | A 2000-327329 | 11/2000 |
| JP | A 2001-224962 | 8/2001 |
| JP | A 2002-1106 | 1/2002 |
| JP | A 2002-79097 | 3/2002 |
| JP | A 2002-282689 | 10/2002 |
| JP | A 2002-331238 | 11/2002 |
| JP | A 2004-42021 | 2/2004 |
| JP | A 2004-82091 | 3/2004 |
| JP | A 2004-345890 | 12/2004 |
| JP | A 2005-125282 | 5/2005 |
| JP | A 2006-7148 | 1/2006 |

* cited by examiner

*Primary Examiner*—Timothy C Vanoy
*Assistant Examiner*—Michelle Hou
(74) *Attorney, Agent, or Firm*—Oliff & Berridge, PLC

(57) ABSTRACT

A structure having strong contact with solid particles comprising an assembly formed by secondary aggregation which is further aggregation of aggregates each formed by primary aggregation of primary particles each made of a metal and/or a metal oxide, wherein an average primary particle diameter of the primary particles is in a range from 1 to 100 μm, and, among void pores formed by the aggregates, a volume of void pores having pore diameters in a range within ±50% away from an average void pore diameter of the void pores is equal to or above 60% of a total volume of the void pores.

27 Claims, 23 Drawing Sheets

STRUCTURE HAVING STRONG CONTACT WITH SOLID PARTICLES, SUBSTRATE HAVING STRONG CONTACT WITH SOLID PARTICLES, AND MANUFACTURING METHODS THEREOF

TECHNICAL FIELD

The present invention relates to a structure having strong contact with solid particles and a manufacturing method thereof, a substrate having strong contact with solid particles using the structure having strong contact with solid particles, and a fluid dispersion of a structure having strong contact with solid particles and a method using the same for manufacturing a substrate having strong contact with solid particles.

BACKGROUND OF THE INVENTION

Concerning a gasoline engine, hazardous components in exhaust gas has been steadily decreased by strict regulations of exhaust gas and advance in technology that can deal with the regulations. However, concerning a diesel engine, there are still many technical problems left with purification of exhaust gas because the exhaust gas contains particulates (particulate matter: such as soot composed of carbon particulates or soluble organic fractions (SOF), hereinafter referred to as PM).

Accordingly, in recent years, the oxidation catalyst capable of oxidizing and removing PMs, particularly soot components, at low temperature have been developed. For example, Japanese Unexamined Patent Application Publication No. 2004-42021 (Document 1) discloses a catalyst composition containing silver (Ag) and/or cobalt (Co) stabilized ceria ($CeO_2$), which facilitates soot oxidation during the regeneration of DPF. Here, a method of manufacturing the catalyst described in Document 1 is a method of obtaining the catalyst composition having a porosity wherein a pore size is centered around 70 to 200 Å and a high specific surface area ranging from 14 to 150 $m^2/g$ by impregnating a cellulose material (Whatman (registered trademark) Filter Paper 540) with a nitrate precursor and burning the cellulose at 600° C. and for two hours after drying the material overnight at a room temperature. However, it was not possible to oxidize carbon-containing components, such as soot, and components, such as HC, CO or NO, sufficiently at low temperature by the catalyst compositions disclosed in Document 1, i.e. merely by presence of a set of Ag and $CeO_2$ or a set of Ag, Co and $CeO_2$.

Meanwhile, in recent years, among PMs emitted from diesel engines, PM2.5 which has a particle diameter of 2.5 μm or less has become a problem. Among others, development of technology for removing PMs having particularly smaller particle diameters has been requested. For example, Japanese Unexamined Patent Application Publication No. 2006-7148 (Document 2), discloses a filter for purification of exhaust gas in which multiple filters are arranged along a direction of a flow of exhaust gas. The filter for purification of exhaust gas has a wall-through-type filter and a filter having a needle-like material or fibers formed on a wall thereof which is in contact with exhaust gas. However, there have been problems that one, as described in Document 2, having two kinds of filters in combination has a complex configuration, and that a needle-like material comprising an inorganic material which is desirably avoided for use if possible.

DISCLOSURE OF THE INVENTION

The present invention has been made in view of the above-mentioned problem of the conventional techniques. An object of the present invention is to provide: a structure having strong contact with solid particles, which is capable of efficiently trapping a wide range of solid particles, including carbon-containing components such as soot and PMs having small particle diameters, and extremely useful as an oxidation catalyst and the like; a substrate having strong contact with solid particles using the same; and manufacturing methods capable of efficiently and surely obtaining the structure having strong contact with solid particles and the substrate having strong contact with solid particles.

As a result of earnest studies for attaining the object, the present inventors have found out that, when the average primary particle diameter of the primary particles is set in a predetermined range while increasing the uniformity in pore diameters of void pores formed by the aggregates, an assembly formed by secondary aggregation which is further aggregation of aggregates each formed by primary aggregation of primary particles made of metal and/or metal oxide has improved contact with a wide range of solid particles including carbon-containing components such as soot and PMs having small particle diameters and becomes a structure having strong contact with solid particles which is capable of efficiently trapping these solid particles. This finding has led the inventors to complete the present invention.

A structure having strong contact with solid particles of the present invention comprises:

an assembly formed by secondary aggregation which is further aggregation of aggregates each formed by primary aggregation of primary particles each made of a metal and/or a metal oxide, wherein an average primary particle diameter of the primary particles is in a range from 1 to 100 nm, and, among void pores formed by the aggregates, a volume of void pores having pore diameters in a range within ±50% away from an average void pore diameter of the void pores is equal to or above 60% of a total volume of the void pores.

The structure having strong contact with solid particles of the present invention preferably satisfies at least one of conditions (i) to (iii) described below, more preferably satisfies at least two of the conditions, and particularly preferably satisfies all of the conditions.

(i) A volume of pores having pore diameters in a range from 0.01 to 0.5 μm (more preferably from 0.05 to 0.5 μm) in the assembly is from 20 to 99% of a total volume of the pores of the assembly.

(ii) A volume of pores having pore diameters in a range from 0.01 to 1.0 μm in the assembly is from 0.05 to 1.0 cc/g.

(iii) The average particle diameter of the aggregates ranges from 0.01 to 0.5 μm (more preferably from 0.05 to 0.5 μm), and a portion equal to or above 60% by volume of all the aggregates has particle diameters in a range within ±50% away from the average particle diameter.

The structure having strong contact with solid particles preferably contains, as the primary particle, at least one substance selected from the group consisting of oxides of La, Ce, Pr, Nd, Pm, Sm, Eu, Gd, Tb, Dy, Ho, Er, Tm, Yb, Lu, Y, Zr, Fe, Ti, Al, Mg, Co, Ni, Mn, Cr, Mo, W, and V, solid solutions thereof, and composite oxides thereof. In such a case, it is particularly preferable that metal ultrafine particles supported on the surface of the primary particles be further provided.

Further, the structure having strong contact with solid particles of the present invention preferably includes, as individual aggregates, aggregates each comprising a first metal particle constituting a core and second metal oxide particulates surrounding the first metal particle.

In this case, it is more preferable that a first metal constituting the first metal particles have an ionization tendency equal to or lower than the ionization tendency of Zn, and that a second metal constituting the second metal oxide particulates be a metal with variable valences. Further, it is preferable that the first metal particle be an oxygen-extracting particle made of an oxygen-extracting material which is configured to extract at least oxygen from an oxygen-containing substance to generate an oxygen-reactive-species. Among all, it is particularly preferable that the oxygen-extracting material contain Ag. In addition, it is preferable that the second metal oxide particulates be made of an oxygen-reactive-species transporting material which is capable of transporting an oxygen-reactive-species generated by the oxygen-extracting material. Above all, it is particularly preferable that the oxygen-reactive-species transporting material be a composite oxide containing $CeO_2$ or Ce.

The structure having strong contact with solid particles of the present invention is extremely useful as an oxidation catalyst and the like.

A method of manufacturing a structure having strong contact with solid particles of the present invention comprises the steps of:

generating an aggregate precursor out of a solution containing a first metal salt and a second metal salt such that a first metal particle derived from the first metal salt is surrounded by second metal compound particulates derived from the second metal salt; and by calcining the obtained aggregate precursor, obtaining a structure having strong contact with solid particles including an assembly formed by secondary aggregation which is further aggregation of aggregates each made of the first metal particle constituting a core and second metal oxide particulates surrounding the first metal particle, wherein an average primary particle diameter of the first metal particle and the second metal oxide particulates is in a range from 1 to 100 nm, and, among void pores formed by the aggregates, a volume of void pores having pore diameters in a range within ±50% away from an average void pore diameter of the void pores is equal to or above 60% of a total volume of the void pores.

In the process of generating the aggregate precursor in the method of manufacturing a structure having strong contact with solid particles of the present invention, (i) it is preferable that the second metal compound particulates be generated under the presence of a pH adjuster, and then the aggregate precursor be generated by depositing the first metal particle by a reducing action of the second metal compound particulates, and (ii) it is more preferable that a first metal compound derived from the first metal salt be generated under the presence of a complexing agent, and then the first metal particle be deposited by reducing the first metal compound by a reducing action of the second metal compound particulates.

The first metal salt according to the present invention is preferably a salt of a metal having an ionization tendency equal to or lower than the ionization tendency of Zn, and the second metal salt is preferably a salt of a metal with variable valences.

In addition, it is preferable that the first metal particle according to the present invention be an oxygen-extracting particle made of an oxygen-extracting material which is configured to extract at least oxygen from an oxygen-containing substance to generate an oxygen-reactive-species. Above all, it is particularly preferable that the first metal salt serving as a starting material of the oxygen-extracting material contain Ag. In the meantime, it is preferable that the second metal oxide particulates according to the present invention be oxide-reactive-species transporting particles made of an oxygen-reactive-species transporting material which is capable of transporting an oxygen-reactive-species generated by the oxygen-extracting material. Above all, it is particularly preferable that the second metal salt serving as a starting material of the oxygen-reactive-species transporting material contain a salt of Ce.

In the method of manufacturing a structure having strong contact with solid particles of the present invention, it is preferable that the average particle diameter of the aggregate precursors be in a range from 0.01 to 0.5 μm (more preferably from 0.05 to 0.5 μm), and that a portion equal to or above 60% by volume of all the aggregate precursors have particle diameters in a range within ±50% away from the average particle diameter.

The method of manufacturing a structure having strong contact with solid particles of the present invention is extremely useful as a method of manufacturing an oxidation catalyst and or like.

A substrate having strong contact with solid particles of the present invention comprises a substrate, and the structure having strong contact with solid particles of the present invention. In the substrate having strong contact with solid particles of the present invention, it is preferable that the substrate have pores in a range from 1 to 300 μm and that a coating layer having an average thickness equivalent to 0.05 to 50 times (more preferably 0.5 to 5 times) as large as the average particle diameter of the aggregates be formed inside the pores by the structure having strong contact with solid particles. Among all pores in the substrate having strong contact with solid particles, a proportion of the void pores in the structure having strong contact with solid particles is preferably 1 to 50% by volume. The substrate having strong contact with solid particles of the present invention is extremely useful as a substrate for purification of exhaust gas and the like.

A first fluid dispersion of a structure having strong contact with solid particles of the present invention contains the aggregates according to the present invention and a disperse medium. A second fluid dispersion of a structure having strong contact with solid particles of the present invention contains the aggregate precursor obtained in the process of the method of manufacturing a structure having strong contact with solid particles of the present invention, and a disperse medium.

A method of manufacturing a substrate having strong contact with solid particles of the present invention is a method wherein a substrate having strong contact with solid particles is obtained by causing any of the first fluid dispersion of a structure having strong contact with solid particles and the second fluid dispersion of a structure having strong contact with solid particles to contact a substrate, followed by calcination.

Here, it is not known exactly why the structure having strong contact with solid particles of the present invention can be improved in contact with a wide range of solid particles including carbon-containing components such as soot and PMs having small particle diameters. However, the present inventors speculate as follows. It is generally considered that, in order to increase contact with solid particles including carbon-containing components such as soot and PMs having small particle diameters, catalyst particles which also have small particle diameters should be dispersed and arranged. However, since solid particles like PMs actually exist in a form of secondary or higher order aggregate having a three-dimensional structure, contact is not improved by simply dispersing and arranging catalyst particles having small particle diameters. Therefore, as a result of earnest studies conducted by the present inventors focusing on a morphology which has especially strong contact with these solid particles, the following has discovered: when an aggregate comprising fine primary particles having an average primary particle diameter in a range from 1 to 100 nm is formed, and a structure (assembly) is formed by secondary aggregation of the aggregates, contact points between solid particles, such as PMs, and the aggregates are increased, resulting in good three-dimensional contact, and the contact is largely improved by increasing uniformity of pore diameters of void pores formed by the aggregates.

Here, it is also not known exactly why the structure having strong contact with solid particles of the present invention can be obtained by the method of manufacturing a structure having strong contact with solid particles of the present invention. However, the present inventors speculate as follows. In the method of manufacturing a structure having strong contact with solid particles of the present invention, the second metal compound particulates (solid metal oxide precursors) derived from the second metal salt are generated in a reaction solution, which act on first metal ions or a metal compound both derived from the first metal salt as a reductant and thereby promote a reduction reaction similar to so-called a silver mirror reaction. When the reductant is a solid in an electroless plating reaction based on the reductive method as described above, a deposition reaction of the metal progresses on a surface of the solid and the deposited metal is surrounded by the solid reductant (the second metal compound particulates) at the same time. For this reason, the reaction progresses such that the second metal compound particulates surround the metal particle constituting a core, then zeta potentials of the aggregate precursors change as the second metal compound particulates aggregate around the metal particle, thereby generating repulsive forces among the aggregate precursors. Further, this state is thermodynamically stable. Accordingly, from these speculations, the present inventors conclude that the nano-level aggregate precursors are generated in uniform particle diameters. Then, by calcining the aggregate precursors obtained as described above, it is possible to obtain a structure having strong contact with solid particles formed by secondary aggregation which is further aggregation of aggregates each comprising a first metal particle having a specific particle diameter covered by second metal oxide particulates each having a specific particle diameter, and which has void pores in uniform pore diameters formed by the aggregates.

Therefore, according to the present invention, it is possible to obtain the structure having strong contact with solid particles of the present invention easily and reliably without using hard-to-use materials, such as an organic solvent, or using a dispersion stabilizer, such as PVP, and without requiring conditions, such as a high temperature or an inert atmosphere. It should be noted that the fact that a molar ratio of Ce to Ag in the aggregates obtained in the examples to be described later is approximately 1:1 is deemed to support validity of the speculation concerning the above-described reaction mechanism.

It is not known exactly why it is possible to oxidize a carbon-containing component, such as soot, sufficiently at low temperature in an atmosphere where an oxygen-containing substance is present in the case of using a structure having strong contact with solid particles, among those of the present invention, including the aggregate comprising the first metal particle constituting a core and the second metal oxide particulates surrounding the first metal particle as an oxidation catalyst. However, the present inventors speculate as follows. In the following section, a case of oxidizing a carbon-containing component by using an oxygen-extracting particle as the first metal particle, an oxygen-reactive-species transporting particles as the second metal oxide particulates, and oxygen as the oxygen-containing substance will be described as an example.

As shown in FIG. 1, in the oxidation catalyst of the present invention, an oxygen-extracting particle 1 which is made of a material configured to extract at least oxygen from an oxygen-containing substance to generate an oxygen-reactive-species is surrounded by oxygen-reactive-species transporting particles 2 made of a material which is capable of transporting the generated oxygen-reactive-species. Here, although illustration of the oxygen-reactive-species transporting particles 2 surrounding the oxygen-extracting particle 1 is omitted in FIG. 1 except for one of them, the oxygen-extracting particle 1 is in fact surrounded by the oxygen-reactive-species transporting particles 2. For this reason, a carbon-containing component 3, such as soot, which is an object to be treated (an oxidation target) has a higher probability of coming in contact with the oxygen-reactive-species transporting particle 2 than a probability of coming in direct contact with the oxygen-extracting particle 1. In addition, the oxidation catalyst functions as a structure having strong contact with solid particles in the present invention, contact between the carbon-containing component 3 and the oxygen-reactive-species transporting particles 2 is extremely good.

Then, oxygen is extracted from the oxygen-containing substance by the oxygen-extracting particle 1 even at relatively low temperature (a), then the oxygen-reactive-species (O*: for example, an oxygen ion) extracted and thereby generated is transported onto the surface of the carbon-containing component 3 by the oxygen-reactive-species transporting particle 2, and a surface oxide is formed there (b). Here, it is known that the bonding between the C and O of the surface oxide can be mainly categorized into C=O, C=C, and C—O (Applied Catalysis B, 50, 185-194 (2004)). Subsequently, the surface oxide thus formed is oxidized by oxygen in gas phase or by the oxygen-reactive-species transported through the oxygen-reactive-species transporting particle 2 (c). In this way, an oxidized portion 3' is removed from the periphery of the carbon-containing component 3 (d), then the carbon-containing component 3 is gradually reduced in size (e), and the carbon-containing component 3 is completely oxidized and disappears in the end (f).

As described above, in the oxidation catalyst of the present invention, the oxygen-extracting particle 1 is surrounded by the oxygen-reactive-species transporting particles 2, and, moreover, the contact with solid particles is enhanced. Accordingly, the contact between the carbon-containing component 3 and the oxygen-reactive-species transporting particle 2 is sufficiently ensured, while the contact between the oxygen-extracting particle 1 and oxygen in gas phase is also ensured sufficiently. Consequently, a large amount of the oxygen-reactive-species is supplied from the oxygen-extracting particle 1 to the carbon-containing component 3. From these speculations, the present inventors conclude that the carbon-containing component, such as soot, can be sufficiently oxidized at low temperature. Here, both in the case of oxidizing a substance other than the carbon-containing component, such as soot, by use of the oxidation catalyst of the present invention, and in the case where the oxygen-containing substance is not oxygen, an oxygen-reactive-species is generated, and a carbon-containing component, such as soot, can be oxidized in the same mechanism.

Here, in the present invention, as for the oxygen-containing substance other than $O_2$, it is possible to exemplify compounds, such as $NO_x$, $SO_x$, $O_3$, peroxides, carbonyl compounds, and nitro compounds, which are compounds containing an oxygen atom and are gaseous in an atmosphere for oxidizing a carbon-containing component, such as soot.

According to the present invention, it is possible to provide a structure having strong contact with solid particles, which is capable of efficiently trapping a wide range of solid particles, including carbon-containing components such as soot and PMs having small particle diameters, and extremely useful as an oxidation catalyst and the like, a substrate having strong contact with solid particles using the same, and manufacturing methods capable of efficiently and surely obtaining the structure having strong contact with solid particles and the substrate having strong contact with solid particles.

DETAILED DESCRIPTION OF THE PREFERRED EMBODIMENTS

Figure 1:
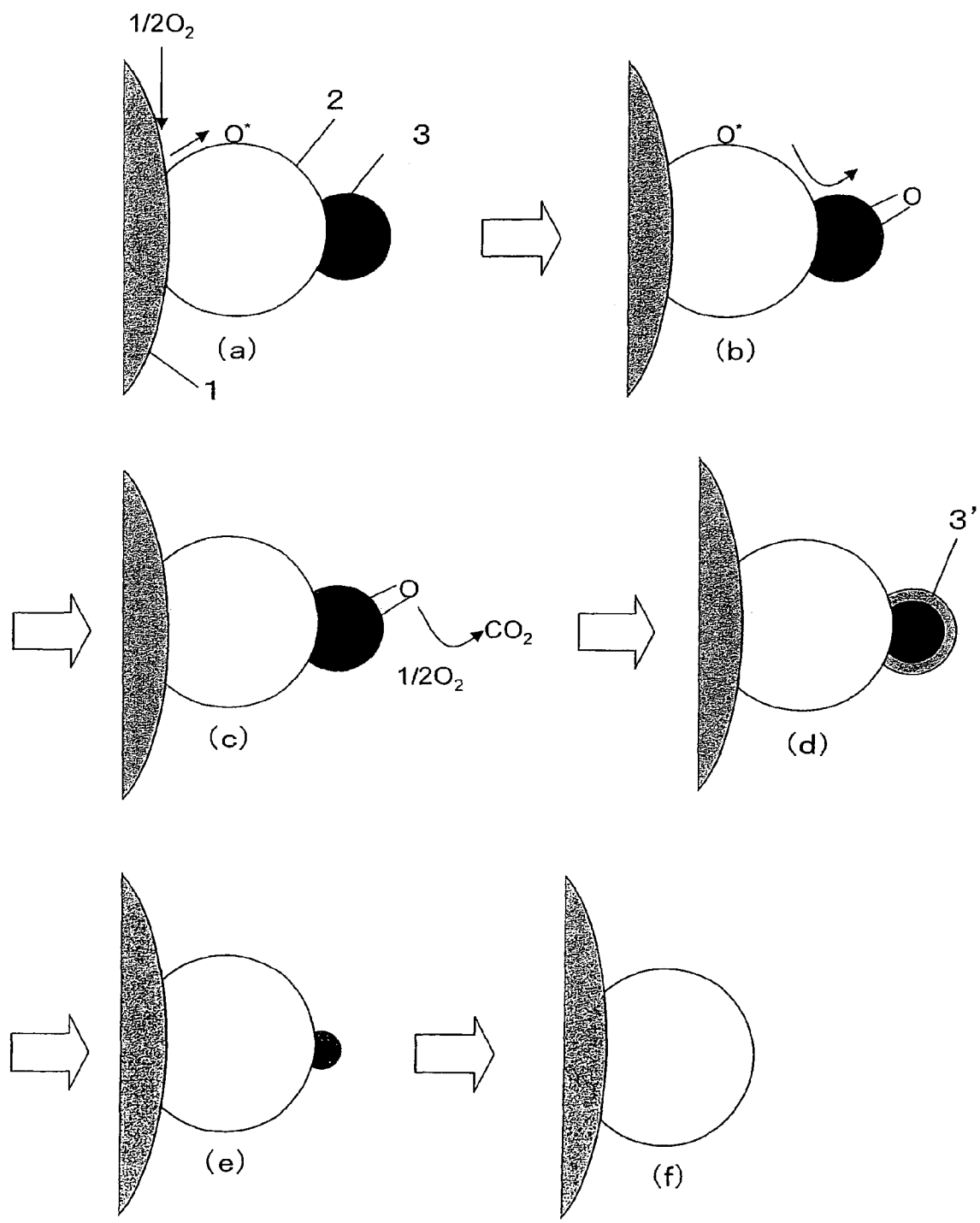
FIG. 1 is a schematic diagram for explaining an action mechanism where a carbon-containing component is oxidized when a structure having strong contact with solid particles of the present invention is used as an oxidation catalyst.

The present invention will be described in detail with reference to preferred embodiments.

First, a structure having strong contact with solid particles of the present invention will be described. A structure having strong contact with solid particles of the present invention comprises:

an assembly formed by secondary aggregation which is further aggregation of aggregates each formed by primary aggregation of primary particles each made of a metal and/or a metal oxide, wherein an average primary particle diameter of the primary particles is in a range from 1 to 100 nm, and, among void pores formed by the aggregates, a volume of void pores having pore diameters in a range within ±50% away from an average void pore diameter of the void pores is equal to or above 60% of a total volume of the void pores.

In the present invention, the average primary particle diameter of the primary particles made of metal and/or metal oxide needs to be in a range from 1 to 100 nm, and is more preferably in a range from 8 to 75 nm, and particularly preferably in a range from 10 to 50 nm. If the average primary particle diameter of the primary particles is less than 1 nm, it is difficult to obtain aggregates having void pores suitable for trapping solid particles. On the other hand, if the average primary particle diameter exceeds 100 nm, contact points with solid particles decrease, and thereby sufficient contact cannot be achieved.

Here, in the structure having strong contact with solid particles of the present invention, aggregates are constituted by the primary aggregation of the primary particles, and these aggregates further undergo secondary aggregation to constitute an assembly. As describe above, the structure having strong contact with solid particles of the present invention is configured to be a high-order aggregate (assembly). Further, void pores formed by the aggregates have a uniform pore diameter. For these reasons, excellent contact can be achieved, as described above, between carton-containing components, such as soot, and a wide range of solid particles including PMs having small particle diameters.

Therefore, in the structure having strong contact with solid particles of the present invention, as for the void pores formed by the aggregates, it is necessary that a volume of void pores having pore diameters in a range within ±50% away from the average void pore diameter of the void pores be equal to or above 60% of the total volume of the void pores, and above 70% is more preferable. If the pore diameters of the void pores do not satisfy this condition, contact points with solid particles decrease, and thereby sufficient contact cannot be achieved.

Here, in the structure having strong contact with solid particles of the present invention, it is preferable that a volume of pores having pore diameters in a range from 0.01 to 0.5 μm (more preferably from 0.05 to 0.5 μm) be in a range from 20 to 99% of the total volume of pores in the assembly, and more preferably from 50 to 98%. If the proportion of the volume of pores having pore diameters in the range falls below the lower limit, three-dimensional contact points with solid particles tend to decrease, resulting in inability to achieve sufficient contact. On the other hand, if the proportion of the volume exceeds the upper limit, contact points of the structure having strong contact with solid particles with solid also decrease whereby sufficient contact tends not to be achieved. Here, when the pore diameters in the assembly are smaller, it is preferable because contact with fine solid particles tends to be increased.

Further, in the structure having strong contact with solid particles of the present invention, it is preferable that a volume of pores having pore diameters in a range from 0.01 to 1.0 μm range from 0.05 to 1.0 cc/g, and more preferably in a range from 0.1 to 0.5 cc/g. If the volume of pores having pore diameters in a range from 0.01 to 1.0 μm falls below the lower limit, contact points with solid particles decrease whereby sufficient contact tends not to be achieved. On the other hand, when the volume exceeds the upper limit, solid particles can easily slip out whereby sufficient contact tends not to be achieved.

Moreover, in the structure having strong contact with solid particles of the present invention, the average particle diameter of the aggregates is preferably in a range from 0.01 to 0.5 μm, more preferably in a range from 0.05 to 0.5 μm, and particularly preferably in a range from 0.07 to 0.2 μm. If the average particle diameter of the aggregates does not satisfy the above condition, three-dimensional contact points decrease whereby sufficient contact tends not to be achieved. Here, when the average particle diameter of the aggregates is smaller, it is preferable because contact with fine solid particles tends to be increased.

In the present invention, it is preferable that dispersibility of the aggregates be high, and that equal to or above 60% by volume (more preferably 70% or above by volume) of all the aggregates have particle diameters in a range within ±50% away from the average particle diameter. If the aggregates do not satisfy this condition, uniformity in the pore diameter of the void pores formed by the aggregates decreases, and three-dimensional contact points with solid particles decrease; thus, sufficient contact tends not to be achieved.

The primary particle according to the present invention should at least comprise metal and/or metal oxide, and it is not particularly limited. However, it is preferable that at least one substance selected from the group consisting of oxides of La, Ce, Pr, Nd, Pm, Sm, Eu, Gd, Tb, Dy, Ho, Er, Tm, Yb, Lu, Y, Zr, Fe, Ti, Al, Mg, Co, Ni, Mn, Cr, Mo, W, and V, solid solutions thereof, and composite oxides thereof be contained as the primary particle. In such a case, it is preferable that metal ultrafine particles, which are the same as third metal ultrafine particles to be described later, be supported on the surface of the primary particles. Further, it is particularly preferable that these metal oxides be an oxygen-reactive-species transporting material to be described below.

The oxygen-reactive-species transporting material is a material which can transport oxygen-reactive-species (for example, oxygen ions) by way of the change in valence and the like of the material itself, for example. When such a material is used, the oxygen-reactive-species can migrate through the oxygen-reactive-species transporting material and reach components, such as carbon-containing components. Such a pathway to transport the oxygen-reactive-species does not have to penetrate the bulk of the oxygen-reactive-species transporting material. It is only necessary, for example, that the oxygen-reactive-species can migrate on a surface of the oxygen-reactive-species transporting material. In the case of oxidizing the carbon-containing component, a contact region between the carbon-containing component and the oxygen-reactive-species transporting material is preferentially oxidized if oxidizing power of the oxygen-reactive-species is too strong, whereby a state of contact between the two is lost and a gap is generated. Accordingly, it is difficult to oxidize the carbon-containing component completely. Therefore, it is preferable that the oxygen-reactive-species have a moderate oxidizing power, i.e. that the oxygen-reactive-species do not react immediately with the carbon-containing component so that the oxygen-reactive-species can migrate on the carbon-containing component.

Such an oxygen-reactive-species transporting material is more preferably at least one substance selected from the group consisting of $CeO_2$, $Fe_2O_3$, $ZrO_2$, $Y_2O_3$, $TiO_2$, $Al_2O_3$, MgO, and $Co_3O_4$, solid solutions thereof, and composite oxides thereof. Among them, a composite oxide containing $CeO_2$ and Ce is particularly preferable. Further, the oxygen-reactive-species transporting material preferably has a certain amount of defects for transporting the oxygen-reactive-species. In the case where the oxygen-reactive-species transporting material is the composite oxide containing $CeO_2$ and Ce, it is more preferable to further contain at least one substance selected from the group consisting of La, Nd, Pr, Sm, Y, Ca, Ti, Fe, Zr, and Al (particularly preferably La and/or Nd) as an additive metal in order to enhance mobility of the oxygen-reactive-species and to surely prevent coarsening of $CeO_2$ particles or composite oxide particles containing Ce. Here, when such an additive component is contained, the content of the additive component is preferably in a range from 1 to 30 mol %, and more preferably in a range from 5 to 20 mol %, relative to a total amount of Ce and the additive component.

Particle diameters of the oxygen-reactive-species transporting particles made of the above-described oxygen-reactive-species transporting material are not particularly limited. However, it is preferable that the average particle diameter thereof after calcination for 5 hours at 500° C. in air be in a range from 1 to 75 nm (more preferably in a range from 8 to 20 nm and even more preferably in a range from 8 to 15 nm). Further, it is preferable that the average particle diameter thereof after calcination for 5 hours at 800° C. in an atmosphere containing oxygen at 10% by volume and nitrogen at 90% by volume be in a range from 8 to 100 nm (more preferably in a range from 8 to 60 nm and even more preferably in a range from 8 to 40 nm). If the average particle diameter of the oxygen-reactive-species transporting particles falls below the above-mentioned lower limit, it tends to be difficult to obtain aggregates having void pores suitable for trapping solid particles. On the other hand, if average particle diameter exceeds the above-mentioned upper limit, contact points with solid particles decrease whereby sufficient contact tends not to be achieved.

From the viewpoint that the structure having strong contact with solid particles of the present invention can be obtained in a manufacturing method to be described later and that uniformity of aggregates and void pores formed by the aggregates can be further improved, it is preferable that the aggregates be each formed by a first metal particle constituting a core and a second metal oxide particulates surrounding the first metal particle.

Here, the first metal particle and the second metal oxide particulate described above in their own are primary particles. A secondary particle formed by the former surrounded by the latter is called "aggregate (or primary aggregate)," and a tertiary particle formed by an assembly of the aggregates is called "assembly (or secondary aggregate."

A first metal constituting the first metal particle according to the present invention preferably has a low ionization tendency from the viewpoint that the metal is easily deposited by the above-mentioned reduction reaction. The first metal is preferably substance having an ionization tendency equal to or lower than the ionization tendency of Zn (for example, Au, Pt, Pd, Rh, Ru, Ag, Hg, Cu, Bi, Sb, Ir, Os, Fe, Co, Ni, Pb, Sn, Cd, Cr, and Zn), more preferably one having the ionization tendency equal to or lower than the ionization tendency of H (for example, Au, Pt, Pd, Rh, Ru, Ag, Hg, Cu, Bi, Sb, Ir, and Os), or particularly preferably one having the ionization tendency equal to or lower than the ionization tendency of Ag (noble metals: for example, Au, Ag, Cu, Pt, Pd, Rh, Ru, Ir, and Os).

Here, the first metal according to the present invention may be a single metal or an alloy made of two or more metals among the above-mentioned metals. Further, part of the first metal may form an oxide or may form a compound with other elements. In the case where part of the first metal forms the oxide or the compound, the content percentage of the above-mentioned metal is preferably equal to or above 0.3% by mass.

Further, from the viewpoint that the obtained structure having strong contact with solid particles can be more effective as a oxidation catalyst, it is preferable that the first metal particle be an oxygen-extracting particle made of an oxygen-extracting material which is configured to extract at least oxygen from an oxygen-containing substance to generate an oxygen-reactive-species.

An oxygen-extracting material according to the present invention is a material which is capable of extracting oxygen. By using such an oxygen-extracting material, it is possible to effectively capture oxygen atoms into the reaction system as shown in FIG. 1 (the reaction system for oxidizing a carbon-containing component and the like). This oxygen-extracting material may also function as an oxygen-containing substance capturing material. The above-described oxygen-extracting material is not particularly limited as long as the material is capable of extracting the oxygen from an oxygen-containing substance, but is preferably the one in which a bonding with an extracted oxygen atom is not too strong. If the bonding with the oxygen atom is too strong, the material cannot supply oxygen-reactive-species to an oxygen-reactive-species transporting material, and thereby cannot achieve a function as a catalyst. When such a material is applied, there is a tendency that it is possible to promote oxidation by supplying a large amount of the oxygen-reactive-species to a component, such as a carbon-containing component, through the oxygen-reactive-species transporting material at lower temperature.

The above-described oxygen-extracting material preferably is at least one substance selected from the group consisting of Ag, Pt, Rh, Pd, Ru, Ir, Au, Cu, Pb, Mn, and Sr. Among these oxygen-extracting materials, Ag, Pt, Au, and Pd belong to the IA group or IB group in the periodic table have a good balance between the extracting property of oxygen from the oxygen-containing substance and the bonding property with the oxygen atoms, and can therefore be used suitably.

Moreover, it is preferable that the above-described oxygen-extracting material contain Ag. Further, when the oxygen-extracting material according to the present invention contains any components other than Ag, it is preferable that the content percentage of Ag be equal to or above 0.3% by mass.

Particle diameters of the oxygen-extracting particles made of the above-described oxygen-extracting material are not particularly limited. However, it is preferable that the average particle diameter thereof after calcination for 5 hours at 500° C. in air be in a range from 10 to 100 nm (more preferably in a range from 10 to 50 nm). It is also preferable that the average particle diameter after calcination for 5 hours at 800° C. in an atmosphere containing oxygen at 10% by volume and nitrogen at 90% by volume be in a range from 10 to 100 nm (more preferably in a range from 10 to 80 nm). If the average particle diameter of the oxygen-extracting particles falls below the above-mentioned lower limit, transfer of the oxygen-reactive-species generated by the oxygen-extracting material to the oxygen-reactive-species transporting material tends to be inhibited. On the other hand, if the average particle diameter exceeds the above-mentioned upper limits, the oxygen-extracting particles are less likely to be surrounded by the oxygen-reactive-species transporting particles.

A second metal constituting the second metal oxide particulates according to the present invention is preferably a metal with variable valences (for example, a metal that changes valence as a reductant of the first metal element that constitutes a core in an aqueous solution) from the viewpoint that the metal can act as a reductant more easily on the first metal or the compound thereof by means of the above-mentioned reduction reaction. It is more preferable that a second metal oxide constituting the second metal oxide particulates is at least one substance selected from the group consisting of oxides of La, Ce, Pr, Nd, Pm, Sm, Eu, Gd, Tb, Dy, Ho, Er, Tm, Yb, Lu, Y, Zr, Fe, Ti, Al, Mg, Co, Ni, Mn, Cr, Mo, W, and V, solid solutions thereof, and composite oxides thereof. It is particularly preferable that the second metal oxide is at least one substance selected from the group consisting of oxides of Fe, Ce, Mn, Mo, Cr, and V, solid solutions thereof, and composite oxides thereof. Alternatively, the second metal oxide according to the present invention may be configured to change the valence by alternately switching between an oxygen atmosphere and a hydrogen atmosphere at a temperature equal to or below 1000° C.

From the viewpoint that the obtained structure having strong contact with solid particles can be more effective as an oxidation catalyst, it is preferable that the second metal oxide particulates be the oxygen-reactive-species transporting particles made of the oxygen-reactive-species transporting material which is capable of transporting the oxygen-reactive-species generated by the oxygen-extracting material.

Here, in the case where the aggregate according to the present invention is formed by surrounding the oxygen-extracting particle with the oxygen-reactive-species transporting particles, it is preferable that the average particle diameter of the oxygen-extracting particles beat least 1.3 times greater, and more preferably at least 2.0 times greater than the average particle diameter of the oxygen-reactive-species transporting particles in both cases after calcination for 5 hours at 500° C. in air and after calcination for 5 hours at 800° C. in an atmosphere containing oxygen at 10% by volume and nitrogen at 90% by volume. If the average particle diameters of the oxygen-extracting particles and oxygen-reactive-species transporting particles do not satisfy this condition, the oxygen-extracting particle is not sufficiently surrounded by the oxygen-reactive-species transporting particles whereby the ability to oxidize a component, such as a carbon-containing component, tends to be degraded.

In the case where the aggregate according to the present invention is formed by surrounding the first metal particle with the second metal oxide particulates, the proportion between the first metal particles and the second metal oxide particulates is not particularly limited. However, the proportion (a molar ratio) between the principal metal constituting the first metal particles and the principal metal constituting the second metal oxide particulates is preferably in a range from 4:1 to 1:9, more preferably in a range from 35:65 to 60:40, and particularly preferably in a range from 40:60 to 60:40. If the amount of the first metal particles falls below this lower limit, an amount of the oxygen-reactive-species to be extracted from the gas phase is reduced whereby the ability to oxidize a component, such as a carbon-containing component, tends to be degraded. On the other hand, if the amount of the second metal oxide particulates falls below this lower limit, an amount of the oxygen-reactive-species capable of migrating to a component, such as a carbon-containing component, is reduced whereby the ability to oxidize the carbon-containing component tends to be degraded. Moreover, when the ratio is in the range from 40:60 to 60:40, it is particularly preferable because the second metal oxide particulates can easily surround the first metal particles and proportions of the respective components not forming those aggregates are reduced.

Furthermore, the present invention may further comprise third metal ultrafine particles supported on the surface of an aggregate formed by surrounding the individual first metal particles with the second metal oxide particulates. When the third metal ultrafine particles are present, further effects, such as that the oxygen-reactive-species tend to be supplied more easily, are more likely to be obtained in the case where the second metal oxide particulates are the oxygen-reactive-species transporting particles.

A third metal constituting the metal ultrafine particles is preferably a substance having a lower ionization tendency than the ionization tendency of H (for example, Au, Pt, Pd, Rh, Ru, Ag, Hg, Cu, Bi, Sb, Ir, and Os), and more preferably a substance having a lower ionization tendency lower than the ionization tendency of Ag (noble metals: for example, Au, Ag, Cu, Pt, Pd, Rh, Ru, Ir, and Os). It is particularly preferable that the third metal be identical to the first metal constituting the first metal particle. Moreover, the third metal ultrafine particle preferably contains 1 to 1000 atoms.

In addition, in the aggregate formed by surrounding the first metal particle with the second metal oxide particulates, the aggregate may be formed while generating cracks on the surface thereof. Moreover, although the shape of the aggregate according to the present invention is not particularly limited, the aggregate is formed preferably in a spherical shape.

Next, a method of manufacturing a structure having strong contact with solid particles of the present invention will be described. The method of manufacturing a structure having strong contact with solid particles of the present invention comprises the steps of:

generating an aggregate precursor out of a solution containing a first metal salt and a second metal salt such that a first metal particle derived from the first metal salt is surrounded by second metal compound particulates derived from the second metal salt; and by calcining the obtained aggregate precursor, obtaining a structure having strong contact with solid particles including an assembly formed by secondary aggregation which is further aggregation of aggregates each made of the first metal particle constituting a core and second metal oxide particulates surrounding the first metal particle, the structure having strong contact with solid particles obtained being that of the present invention.

The first metal salt according to the present invention is preferably a salt of a metal having a lower ionization tendency equal to or lower than the ionization tendency of Zn, and is more preferably a salt of at least one metal selected from the group consisting of Ag, Pt, Rh, Pd, Ru, Ir, Os, Au, and Cu.

In the first metal salt according to the present invention, a first metal forming the salt is preferably a component constituting the above-described oxygen-extracting material. The first metal salt may contain a salt of at least one metal selected from the group consisting of Ag, Pt, Rh, Pd, Ru, Ir, Au, Cu, Pb, Mn, and Sr, for example. Among these metal salts, it is preferable to use one containing Ag. Moreover, examples of the first metal salt include water-soluble salts, such as nitrates, acetates, chlorides, sulfates, sulfites, and inorganic complex salts of the above-mentioned metals. Among them, nitrates (for example, silver nitrate) can be used suitably.

The second metal salt according to the present invention is preferably a salt of a metal with variable valences, and more preferably a salt of at least one metal selected from the group consisting of La, Ce, Pr, Nd, Pm, Sm, Eu, Gd, Tb, Dy, Ho, Er, Tm, Yb, Lu, Y, Zr, Fe, Ti, Al, Mg, Co, Ni, Mn, Cr, Mo, W, and V.

In the second metal salt according to the present invention, a second metal forming the salt or a compound thereof is preferably a component forming the above-described oxygen-reactive-species transporting material by calcination to be described later. The second metal salt is more preferably a salt of at least one metal selected from the group consisting of Ce, Fe, Zr, Y, Ti, Al, Mg, and Co. Among them, it is particularly preferable that the second metal salt contain a salt of Ce and a salt of at least one additive metal selected from the group consisting of La, Nd, Pr, Sm, Y, Ca, Ti, Fe, Zr, and Al. Moreover, examples of the second metal salt include water-soluble salts, such as nitrates, acetates, chlorides, sulfates, sulfites, and inorganic complex salts of the above-mentioned metal. Among them, nitrates (for example, cerium nitrate) can be used suitably.

In the method of manufacturing a structure having strong contact with solid particles of the present invention, it is possible to control the particle diameters of the aggregates by containing the salt of an additive metal as described above. Here, although the reason is not exactly known, the present inventors speculate as follows. When a $CeO_2$—Ag based aggregate is taken as an example, substances involved in oxidation-reduction reaction are the metal Ag to be reduced and Ce functioning as a reductant. Therefore, an additive metal added thereto is not involved in the oxidation-reduction reaction. For this reason, a molar ratio of Ce:Ag is usually around 1:1 even in the case of adding La, for example. Such additive metal forms a metal oxide precursor simultaneously when the second metal salt generates a second metal compound (a metal oxide precursor). From these speculations, the present inventors conclude that, when the second metal compound is involved in the reaction, the particle diameters of the aggregates results in being controlled by an additive metal when the additive metal forms part of the aggregates because the additive metal is mixed with the second metal compound although not involved in the oxidation-reduction reaction. Here, the additive metal tends to have a larger effect to change the particle diameters of the aggregates when the atomic number thereof is further away from that of the second metal.

In addition, a solvent used for preparing a solution containing the first metal salt and the second metal salt is not particularly limited. However, examples of the solvents include water, alcohols (for example, methanol, ethanol, and ethylene glycol, which are used alone, and mixed solvents thereof), and water is particularly preferable.

Here, blending amounts (fed amounts) of the first metal salt and the second metal salt do not have to correspond completely to the proportion between the obtained first metal particles and the obtained second metal oxide particulates. The conditions of the combination and the blending amounts of the first metal salt and the second metal salt are appropriately set depending on suitable conditions of the combination and the proportion of the first metal particles and the second metal oxide particulates in a structure having strong contact with solid particles to be obtained. Further, by allowing the first metal salt to exist in an excessive amount relative to the second metal salt, all the second metal oxide particles generated in the solution can be used to form part of the aggregates. This is preferable because a component other than the aggregates is not generated in the solution.

In the method of manufacturing a structure having strong contact with solid particles of the present invention, it is preferable to generate the aggregate precursor by generating the second metal compound particulates under the presence of a pH adjuster and depositing the first metal particles by use of a reducing action of the second metal compound particulates in the process of generating the aggregate precursor.

The reason for causing oxidation-reduction reaction can be explained by electric potentials of the first metal and the second metal used. However, the electric potential has a pH dependency. In general, the potential becomes lower as the pH becomes higher. Therefore, in the method of manufacturing a structure having strong contact with solid particles of the present invention, it is preferable to control the oxidation-reduction reaction by adding the pH adjuster as appropriate. Moreover, activation energy is also changed by adding the pH adjuster. Accordingly, it is possible to control the oxidation-reduction reaction optimally. The exemplified pH adjusters are NaOH, KOH, $NH_3$, $HNO_3$, and $H_2SO_4$. However, it is only necessary to use ordinary acids and alkalis.

Here, in the case where the first metal is Ag, for example, since the reaction progresses too fast due to high potential in an acidic side, a coarse Ag particle tends to be deposited. Accordingly, it is preferable to establish alkalinity of the solution under the presence of a base. In such case, precipitation is caused if NaOH is used as the adjuster. Therefore, it is preferable to establish alkalinity of the solution by use of ammonia. In this case, ammonia also functions as a complexing agent to be described later. The concentration of the base is not particularly limited. However, when using ammonia as the base, it is generally preferable to use a solvent having an ammonia concentration in a range from approximately 1 to 50%. Moreover, the second metal compound particulates in this case are deemed to be a hydroxide of the second metal.

In the method of manufacturing a structure having strong contact with solid particles of the present invention, it is more preferable to generate a first metal compound derived from the first metal salt under the presence of a complexing agent and then to deposit the first metal particle by reducing the first metal compound by way of the reducing action of the second metal compound particulates in the process of generating the aggregate precursor.

To achieve optimum condition of the oxidation-reduction reaction, it is preferable to add the pH adjuster as described previously. However, in doing so, the metal salt in particular may generate a deposition depending on the pH. Therefore, even under the condition in which precipitate is generated when a complexing agent is not used, it is possible to maintain the state of the metal salt by adding a complexing agent. Since the electric potential and the activation energy are also changed by this operation, it is possible to adjust the condition as appropriate. For example, in the case of a $CeO_2$—Ag based aggregate, it is preferable to use Ag in the form of $[Ag(NH_3)_2]^+$. Examples of the complexing agent include ammonia, alkaline salts of organic acids (glycolic acid, citric acid, tartaric acid, and the like), thioglycolic acid, hydrazine, triethanolamine, ethylenediamine, glycine, pyridine, and cyanides.

Further, in the method of manufacturing a structure having strong contact with solid particles of the present invention, it is preferable to regulate temperature in the process of generating the aggregate precursor. A temperature condition of a reaction solution is an important factor for controlling an oxidation-reduction reaction. It is preferable to regulate the temperature of the solution accordingly within a range where the solvent functions in a liquid state. For example, in the case of a $CeO_2$—Ag based aggregate, the temperature is preferably set to 30° C. or above, and more preferably set to 60° C. or above. As will be described later in examples, it is likely that a reaction can proceed reliably by setting a condition from approximately 100° C. to 150° C. at 1 to 3 atm. This condition is also preferable in light of industrial application because the reaction time can be shortened as well.

Here, in the process of generating the aggregate precursor, it is possible to apply either a so-called "precipitation method" wherein a pH adjuster-containing solution (for example, a basic solution) is added and mixed to a solution of the above-described metal salt or a so-called "reverse precipitation method" wherein the solution of the above-described metal salt is added and mixed to the pH adjuster-containing solution (for example, a basic solution). In this case, it is possible to add and blend sequentially in the order of the first metal salt and the second metal salt or in the reverse order. Although the reaction time is not particularly limited, it is preferable to cause aggregation preferably over a period of approximately 0.1 to 24 hours, and more preferably over a period of approximately 0.1 to 3 hours.

A solid content concentration of the reaction solution in the process of generating the aggregate precursor is not particularly limited. However, the concentration is preferably in a range from 1% by mass to 50% by mass, more preferably in a range from 10% by mass to 40% by mass, and even more preferably in a range from 15% by mass to 30% by mass. If the solid content concentration falls below this lower limit, the effect of promoting the aggregation process tends to decrease. On the other hand, if the solid content concentration exceeds this upper limit, it tends to be difficult to obtain an aggregate containing the first metal particle constituting a core.

In the present invention, it is possible to effectively and surely obtain an aggregate precursor where the first metal particle is surrounded by the second metal compound particulates, by carrying out the aggregation process as described above.

In the present invention, the average particle diameter of the above-described aggregate precursors is not particularly limited, but is preferably in a range from 0.05 to 0.5 μm, and more preferably in a range from 0.07 to 0.2 μm. Moreover, it is preferable that the aggregate precursors have high dispersibility and that a portion equal to or above 60% by volume of all the aggregates has particle diameters in a range within ±50% away from the average particle diameter. When the aggregate precursors have high dispersibility as described above, the obtained structure having strong contact with solid particles of the present invention has high dispersibility, and thereby more likely to be supported uniformly on a support, such as DPF.

Further, in the present invention, it is possible to obtain the above-described structure having strong contact with solid particles of the present invention by cleaning as necessary and then calcining the aggregate precursors that are obtained by the above-described aggregation process. Although conditions of such a calcination process are not particularly limited, it is generally preferable to perform calcination for approximately 1 to 5 hours at a temperature in a range from 300° C. to 600° C. in an oxidizing atmosphere (for example, air).

Here, the method of manufacturing a structure having strong contact with solid particles of the present invention may further comprise a step of removing the first metal particle from the assembly obtained in the above process. Although the method of removing the metal particle is not particularly limited, examples are a method of dissolving metal particles by use of acid or heat, and a method of taking out metal particles by oscillation.

Next, a substrate having strong contact with solid particles of the present invention will be described. A substrate having strong contact with solid particles of the present invention comprises a substrate and the structure having strong contact with solid particles of the present invention.

The substrate used herein is not particularly limited, and is appropriately selected according to the usage or the like of the substrate having strong contact with solid particles to be obtained. However, a DPF substrate, a monolithic substrate, a pelletized substrate, a platy substrate, a foamed ceramic substrate, and the like can be applied suitably. Moreover, a material of the substrate is also not particularly limited. However, substrates made of ceramics, such as cordierite, silicon carbide, and mullite, and substrates made of metals, such as stainless steels containing chromium and aluminum, can be applied suitably.

An amount of a structure having strong contact with solid particles to be attached to the substrate in the substrate having strong contact with solid particles of the present invention is not particularly limited, and is appropriately adjusted according to the usage or the like of the substrate having strong contact with solid particles to be obtained. However, the amount of the structure having strong contact with solid particles is preferably in a range from approximately 10 to 300 g per liter of the volume of the substrate. Here, it is also possible to, for example, pelletize the structure having strong contact with solid particles of the present invention prior to use. Moreover, in the substrate having strong contact with solid particles of the present invention, it is preferable that the substrate has pores ranging from 1 to 300 μm, and that a coating layer having an average thickness equivalent to 0.05 to 50 times (more preferably 0.5 to 5 times) as large as the average particle diameter of the aggregate be formed inside the pores by the structure having strong contact with solid particles.

Among all pores included in the substrate having strong contact with solid particles, a proportion of the void pores in the structure having strong contact with solid particles is preferably in a range from 1 to 50% by volume. If this proportion falls below 1% by volume, contact tends to be decreased due to a decrease of the structure having strong contact with solid particles itself. On the other hand, if the proportion exceeds 50% by volume, solid particles block pores in the substrate whereby contact tends to be decreased. Here, within a range where solid particles do not block pores of the substrate, contact with solid particle tends to be increased when a volume of the void pores is larger. In the case where solid particles are blocking pores of the substrate, the function as a structure having strong contact can be recovered by removing the solid particles by use of a publicly-known method of removing solid particles. An example of the method of removal, in the case of using the substrate as a catalyst for removing PMs in exhaust gas, for example, is a so-called "forced regeneration treatment." In this case again, the use of the structure having strong contact with solid particles of the present invention allows a regeneration treatment to be carried out at low temperature and/or in a short period of time.

By configuring the substrate to include the structure having strong contact with solid particles of the present invention, it is possible to trap large solid particles and high-order aggregates of solid particles with pores of the substrate, and to trap low-order aggregates, such as primary particles and secondary particles of solid particles, by causing them to come in contact with the structure having strong contact with solid particles of the present invention. Therefore, it is possible to surely remove solid particles. The substrate having strong contact with solid particles of the present invention is extremely useful as a substrate for purification of exhaust gas and the like.

Next, a method of manufacturing fluid dispersions of a structure having strong contact with solid particles of the present invention will be described. A first fluid dispersion of a structure having strong contact with solid particles of the present invention contains the aggregate according to the present invention and a disperse medium. It is preferable that this first fluid dispersion of a structure having strong contact with solid particles of the present invention further contain a binder. The binder used herein is not particularly limited, and ceria sol is used preferably, for example. Moreover, a blend ratio between the aggregate and the binder is not particularly limited, and it is preferable that the blend ratio by weight between the aggregate and the binder is in a range from approximately 99:1 to 80:20. In the case of a $CeO_2$—Ag based aggregate, for example, it is possible to easily obtain a fluid dispersion (slurry) having high dispersibility by an ultrasonic treatment even in the case of using a binder.

A second fluid dispersion of a structure having strong contact with solid particles of the present invention contains the aggregate precursor obtained in the process of the method of manufacturing a structure having strong contact with solid particles of the present invention, and a disperse medium. This second fluid dispersion of a structure having strong contact with solid particles preferably contains an aggregate precursor obtained by removing 50 to 99.9% of residual ions in a system from a solution containing the aggregate precursor which is obtained in the process of the method of manufacturing a structure having strong contact with solid particles of the present invention. Although dispersibility in the aggregating stage is not very good due to the presence of residual ions attributable to a salt and a complexing agent, it is possible to obtain a fluid dispersion having extremely high dispersibility by removing these residual ions.

Next, a method of manufacturing a substrate having strong contact with solid particles of the present invention will be described. A first method of manufacturing a substrate having strong contact with solid particles of the present invention is a method wherein a substrate having strong contact with solid particles is obtained by causing the first fluid dispersion of a structure having strong contact with solid particles of the present invention to contact a substrate, followed by calcination. Meanwhile, a second method of manufacturing a substrate having strong contact with solid particles of the present invention is a method wherein a substrate having strong contact with solid particles is obtained by causing the second fluid dispersion of a structure having strong contact with solid particles of the present invention to contact a substrate, followed by calcination.

Here, the method of causing the fluid dispersion of a structure having strong contact with solid particles to contact a substrate is not particularly limited. However, it is preferable to cause the contact while applying ultrasonic waves when the fluid dispersion is caused to penetrate the pores in a filter substrate, such as DPF. Moreover, it is preferable that the calcination condition in this case be similar to the calcination condition described previously.

Moreover, according to a second method of manufacturing a substrate having strong contact with solid particles of the present invention, a component which is capable of oxidizing a carbon-containing component, such as soot, is itself an aggregate; therefore, the component itself plays the role as a binder. As a result, a more effective substrate having strong contact with solid particles can be provided. Here, the method of obtaining the substrate by causing the second fluid dispersion of a structure having strong contact with solid particle to contact a substrate, followed by calcination is applicable not only to the case of obtaining the aggregate obtained in the process of obtaining the above-described structure having strong contact with solid particles but also to the case of obtaining other substrates. Specifically, the aggregate may consist of particles of a single type as long as the aggregate plays the role as a binder. In this case, it is preferable that the aggregate have high dispersibility in order to obtain a uniform coating layer. Meanwhile, it is preferable to provide small particle diameters in order to achieve thin-layer coating.

EXAMPLES

The present invention will be described below more concretely based on Examples and Comparative Examples. However, the present invention will not be limited only to the following Examples.

Here, cerium nitrate hexahydrate was used as a Ce raw material, silver nitrate was used as an Ag raw material, and lanthanum nitrate hexahydrate was used as a La raw material.

Here, obtained compositions are expressed by use of molar percentage of Ag relative to (Ce+Ag) at the stage of preparing nitrate solutions. For example, a composition obtained by preparing a nitrate solution so as to render Ag equal to 60 mol % is expressed as "$CeO_2$—Ag60" (or "Ce—Ag60"). Meanwhile, the case of preparing a composition by a precipitation method is indicated as "precipitation," while the case of preparing a composition by a reverse precipitation method is indicated as "reverse precipitation."

Example 1

A nitrate solution containing Ce and Ag was prepared so as to render a content percentage (mol %) of Ag relative to a total amount of Ce and Ag equal to 60 mol %. To be more specific, a solution was prepared by dissolving 50.49 g of $Ce(NO_3)_3 \cdot 6H_2O$ and 29.63 g of $AgNO_3$ into 120 mL of water. Next, ammonia water (ammonia water prepared by diluting 35.6 g of 25% ammonia water with 100 g of water) containing an amount of $NH_3$ necessary for precipitating the nitrates was prepared. Then, the nitrate solution was added to the ammonia water while being stirred (reverse precipitation) and the stirring was continued for 10 minutes. Thereafter, an aggregation process was conducted under the presence of water in a closed system for 2 hours while heating up to 120° C. at a pressure of 2 atm. After that, the obtained sediment (an aggregate precursor) was subjected to calcination for 5 hours at 500° C. in air. As a result, a $CeO_2$—Ag composition "$CeO_2$—Ag60" (a structure having strong contact with solid particles) made of Ag and ceria was obtained.

<Evaluation of an Ag Content Percentage>

The content percentage of Ag in the obtained $CeO_2$—Ag60 was analyzed by ICP emission spectrometry, and found to be 50.2 mol %.

<Evaluation of the $CeO_2$ Particle Diameter and Ag Particle Diameter>

The $CeO_2$ particle diameter (average primary particle diameter) and the Ag particle diameter (average primary particle diameter) in the obtained $CeO_2$—Ag60 were examined by XRD, and it was found that the $CeO_2$ particle diameter was 11 nm and the Ag particle diameter was 29 nm.

Moreover, one obtained by calcining the $CeO_2$—Ag60 for 5 hours at 800° C. in an atmosphere containing oxygen at 10% by volume and nitrogen at 90% by volume was also subjected to the same measurement, and it was found that the $CeO_2$ particle diameter was 41 nm and the Ag particle diameter was 52 nm.

<SEM Observation>

Figure 2:
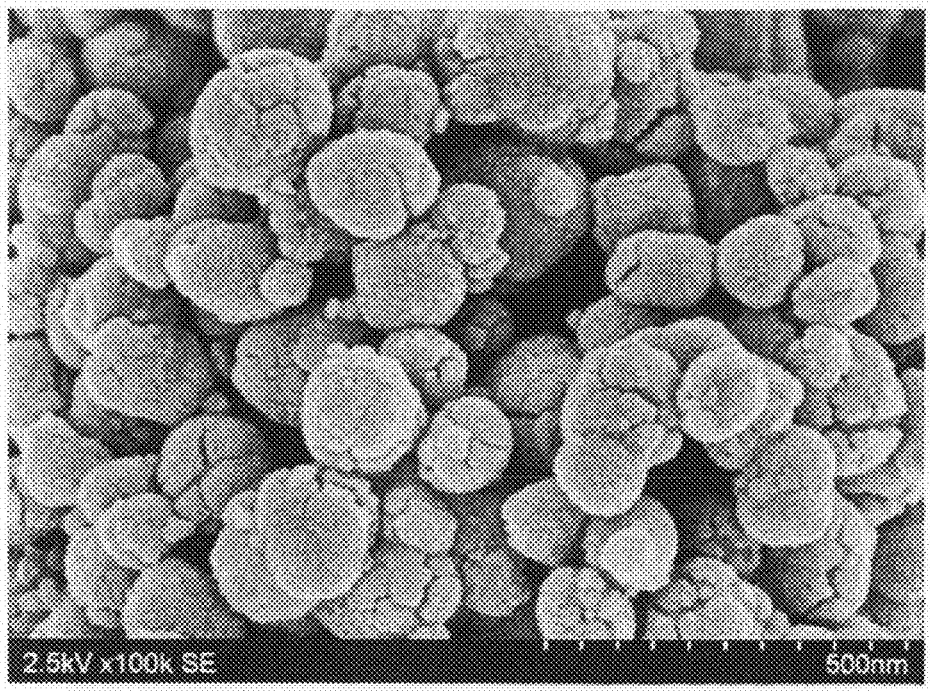
FIG. 2 is an SEM photograph showing a surface state of a $CeO_2$—Ag composition obtained in Example 1.

The surface state of the obtained $CeO_2$—Ag60 was observed by SEM (scanning electron microscope). The obtained result is shown in FIG. 2. Considering the result shown in FIG. 2, the particle diameters obtained by XRD, and the fact that a morphology where $CeO_2$ aggregated was confirmed by TEM, the aggregates observed at an order of approximately 100 nm were formed by primary aggregation of $CeO_2$ particles and Ag particles. It was observed that the aggregates further formed an assembly (a high-order aggregate) in the secondary aggregation.

<Measurement of Particle Size Distribution>

Figure 3:
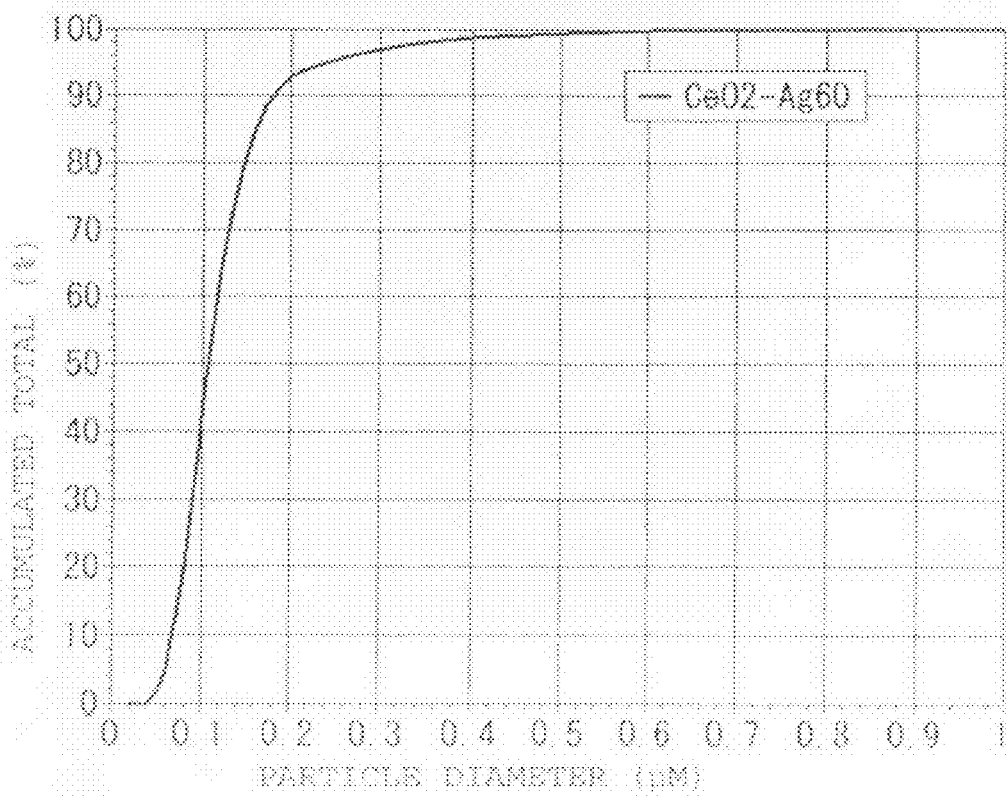
FIG. 3 is a graph showing particle size distribution (accumulated total) of the $CeO_2$—Ag composition obtained in Example 1.

The obtained $CeO_2$—Ag60 was subjected to measurement of particle size distribution by use of a laser diffraction/scattering particle size distribution analyzer (MT3300EX, made by Nikkiso Co. Ltd.). The obtained result of measurement of particle size distribution is shown in FIG. 3 in which the longitudinal axis is an accumulated total (in percent by volume). As apparent from the result shown in FIG. 3, the average particle diameter of the aggregates in the obtained $CeO_2$—Ag60 was approximately 0.1 μm. Hence, it was confirmed that approximately 80% of the particles fell in a range from 0.05 to 0.15 μm that represents the range of 0.1 μm ±50%.

<Evaluation of Pore Volume and Pore Diameter Distribution>

Figure 4:
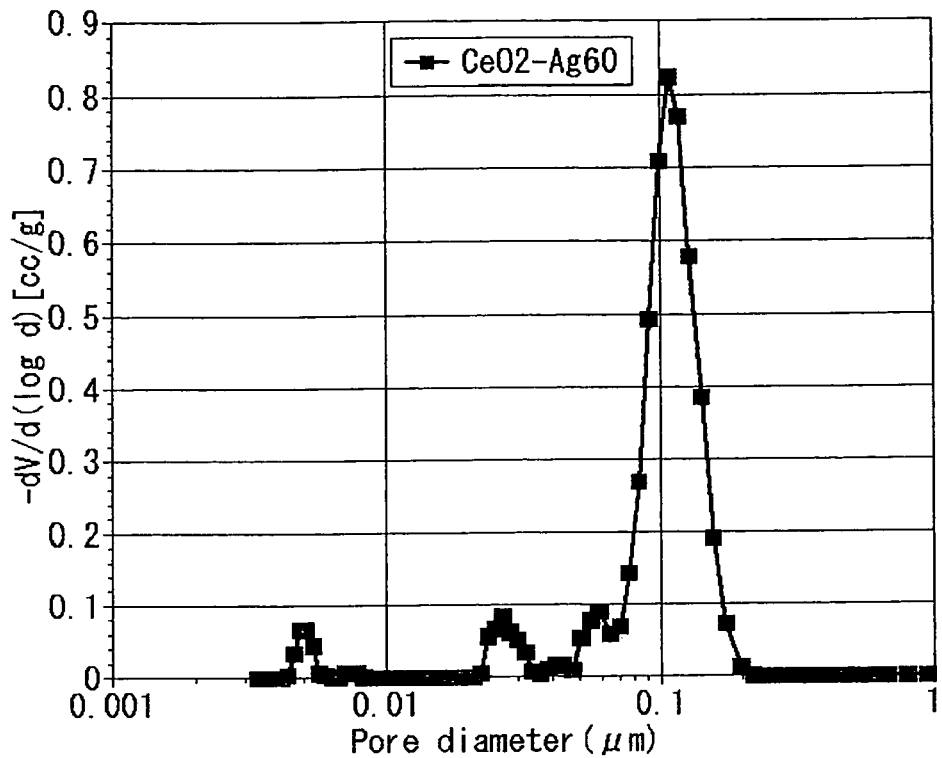
FIG. 4 is a graph showing pore diameter distribution of the $CeO_2$—Ag composition obtained in Example 1.
Figure 5:
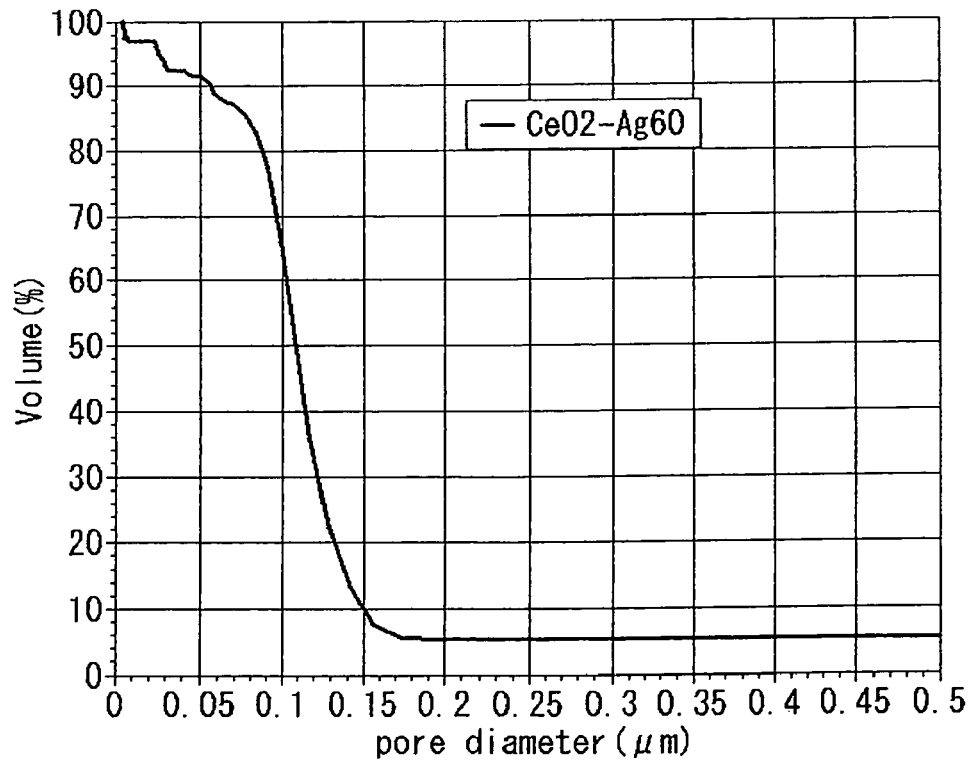
FIG. 5 is a graph showing pore diameter distribution (accumulated total) of the $CeO_2$—Ag composition obtained in Example 1.

The pore volume and pore diameter distribution of the obtained $CeO_2$—Ag60 were measured by use of a mercury porosimeter. The obtained results are shown FIG. 4 and FIG. 5 (FIG. 5 shows distribution of accumulated total volume). As a result, it was found that the volume of all the pores was 0.21 cc/g and the volume of pores having pore diameters in a range from 0.01 to 1.0 μm was 0.19 cc/g.

Here, the range of void pores formed by the aggregates was from 0.06 to 0.18 μm, and the average diameter of the void pores was 0.1 μm. Hence, according to the result shown in FIG. 5, it was confirmed that the volume of void pores having pore diameters in a range from 0.05 to 0.15 μm that represents the range within ±50% away from the average diameter of the void pores accounted for 80% of the total volume of the pores. Moreover, it was also confirmed that the volume of pores having pore diameters in a range from 0.05 to 0.5 μm accounted for 85% of the volume of all the pores.

<Evaluation of Adhesiveness Based on $CO_2$ Generation Intensity>

Sample 1 and Sample 2 were prepared by blending the obtained $CeO_2$—Ag60 with soot (carbon composition 99.9% or above) respectively in accordance with the following two blending methods. Here, a blend ratio of the $CeO_2$—Ag to the soot was set to 2:0.1 by weight (g).

(Sample 1) A uniform mixture was obtained by a "loose blending method" using a stirrer (MMPS-M1, made by AS ONE Corporation) and a magnet mortar (MP-02, made by AS ONE Corporation) and blending for 3 minutes by electric mixing with a speed scale set to "3."

(Sample 2) The uniform mixture of Sample 1 was further blended by using an agate mortar, and the blend was repeated until no further improvement in soot oxidation activity by blending was observed to obtain a uniform mixture blended by a "strong blending method." In the drawings attached to this specification, ones each corresponding to Sample 2 are denoted as "tight."

Here, in the case where the catalyst and soot are caused to contact each other in pores by use of DPF, a mixed condition, so-called "loose-contact," in which the catalyst and the soot is simply blended due to pressure by exhaust pressure and multiple collisions within DPF pores, is achieved; therefore, contact is improved. Sample 1 is considered to correspond to the mixed state in which a catalyst and soot are caused to contact each other in pores by use of DPF.

On the other hand, in a mixed state which is the so-called "strong blending method" in which blending is maximally carried out in a mortar, although contact can be maximized, influences by morphological factors are eliminated, resulting in evaluation solely focusing on chemical properties. Sample 2 corresponds to the mixed state called "strong blending method."

Figure 6:
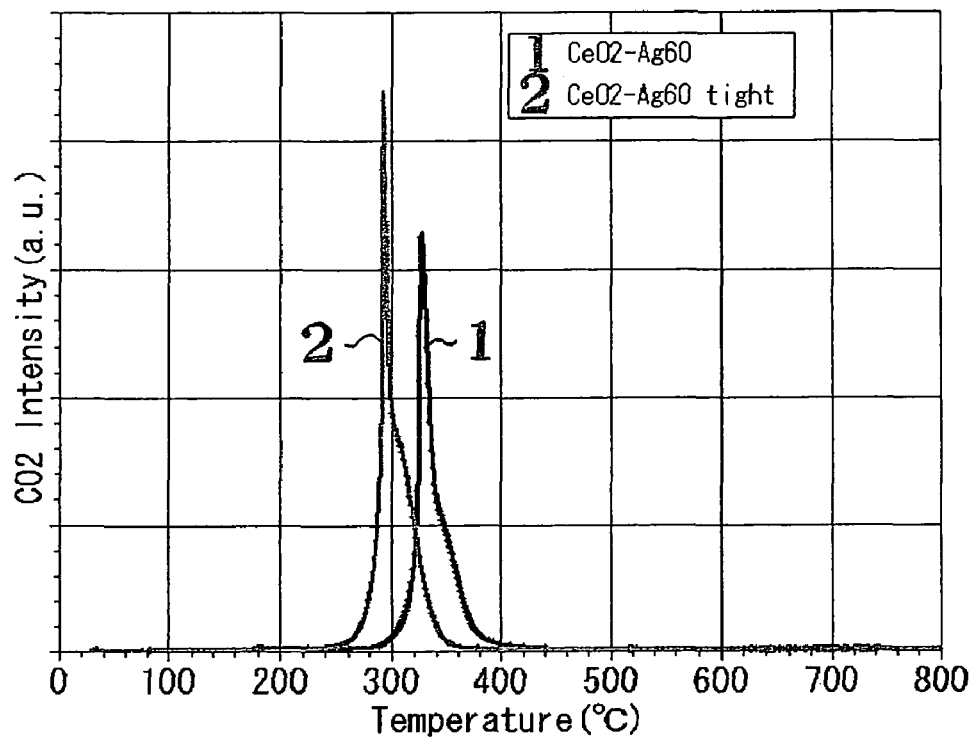
FIG. 6 is a graph showing results of $CO_2$ generation intensity evaluations using the $CeO_2$—Ag composition obtained in Example 1.

Next, Sample 1 and Sample 2 were each subjected to measurement of $CO_2$ generation intensity upon rise in temperature in accordance with a TG-mass method. A thermogravimetric analyzer "TG8120" (made by Rigaku Corporation) was used herein. To the thermogravimetric analyzer, "GC-MS5972A" (made by Hewlett Packard) was connected, and thereby mass spectra of gas components generated from the thermogravimetric analyzer were measured. Regarding measurement conditions, the temperature was raised up to 800° C. at a temperature increasing rate of 20 K/min in an $O_2$ 10%/He balanced atmosphere. Here, m/e=44 components were measured as the $CO_2$ components to be generated by soot oxidation. The obtained results are shown in FIG. 6. Here, in the drawing, the result of Sample 1 is indicated as "1," and the result of Sample 2 is indicated as "2."

As apparent from the results shown in FIG. 6, in the case of the $CeO_2$—Ag60 of the present Example, although representing the "loose blending method," Sample 1 achieved oxidation performance equivalent to that of Sample 2 that represented the "strong blending method." Therefore, it was confirmed that strong contact equivalent to that of Sample 2 was also achieved in Sample 1. To be more specific, the chemical properties of Sample 1 and Sample 2 were completely identical; thus, it has been proven that one satisfying the morphology (conditions) according to the present invention is superior as a structure having strong contact with solid particles.

Example 2

A $CeO_2$—Ag composition "$CeO_2$—Ag20" (a structure having strong contact with solid particles) comprising Ag and ceria was obtained similarly to Example 1 except for setting the content percentage (mol %) of Ag relative to the total amount of Ce and Ag to 20 mol %.

The content percentage of Ag in the obtained $CeO_2$—Ag20 was evaluated similarly to Example 1, and found to be 20 mol %. Here, in the obtained $CeO_2$—Ag20, the $CeO_2$ particle diameter was 14 nm, and the Ag particle diameter was 24 nm.

Figure 7:
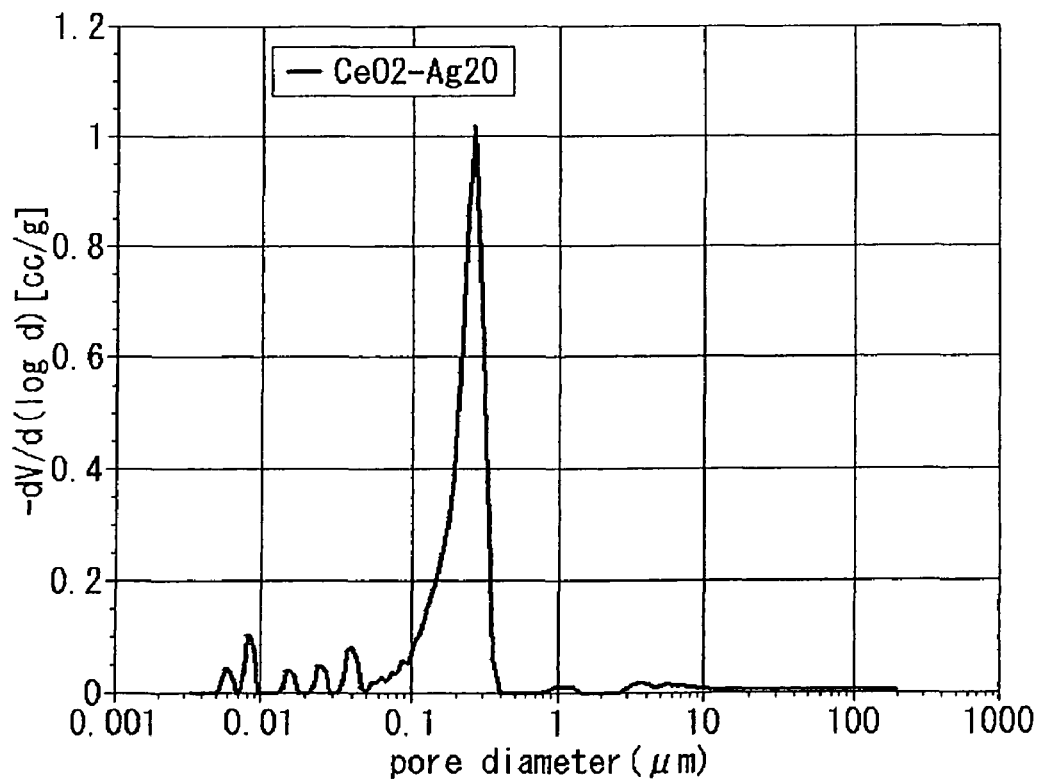
FIG. 7 is a graph showing pore diameter distribution of a $CeO_2$—Ag composition obtained in Example 2.
Figure 8:
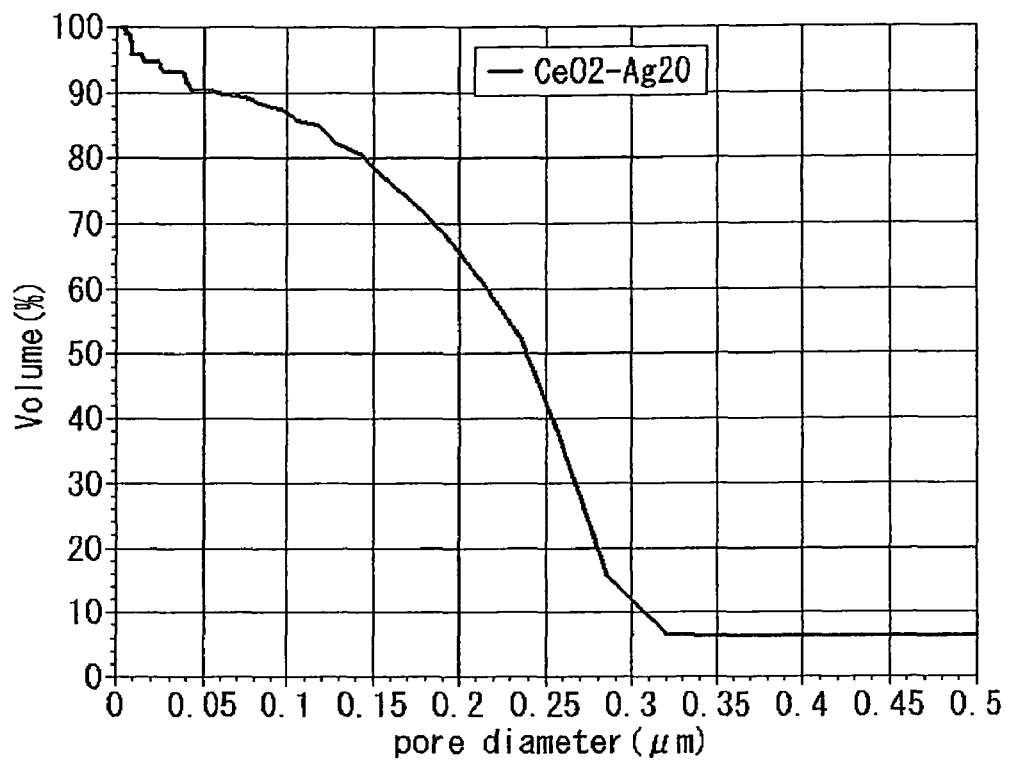
FIG. 8 is a graph showing pore diameter distribution (accumulated total) of the $CeO_2$—Ag composition obtained in Example 2.

The pore volume and pore diameter distribution of the obtained $CeO_2$—Ag20 were measured similarly to Example 1. The obtained results are shown in FIG. 7 and FIG. 8 (FIG. 8 shows distribution of accumulated total volume). As a result, it was found that the volume of all the pores was 0.26 cc/g, and the volume of pores having pore diameters in a range 0.01 to 1.0 μm was 0.23 cc/g. Here, the range of void pores formed by the aggregates was from 0.05 to 0.32 μm, and the average diameter of the void pores was 0.2 μm. Hence, according to the result shown in FIG. 8, it was confirmed that the volume of void pores having pore diameters in a range from 0.1 to 0.3 µm that represents the range within ±50% away from the average diameter of the void pores accounted for 80% of the total volume of the void pores. Moreover, it was also confirmed that the volume of pores having pore diameters in a range from 0.05 to 0.5 µm accounted for 85% of the volume of all the pores.

Figure 9:
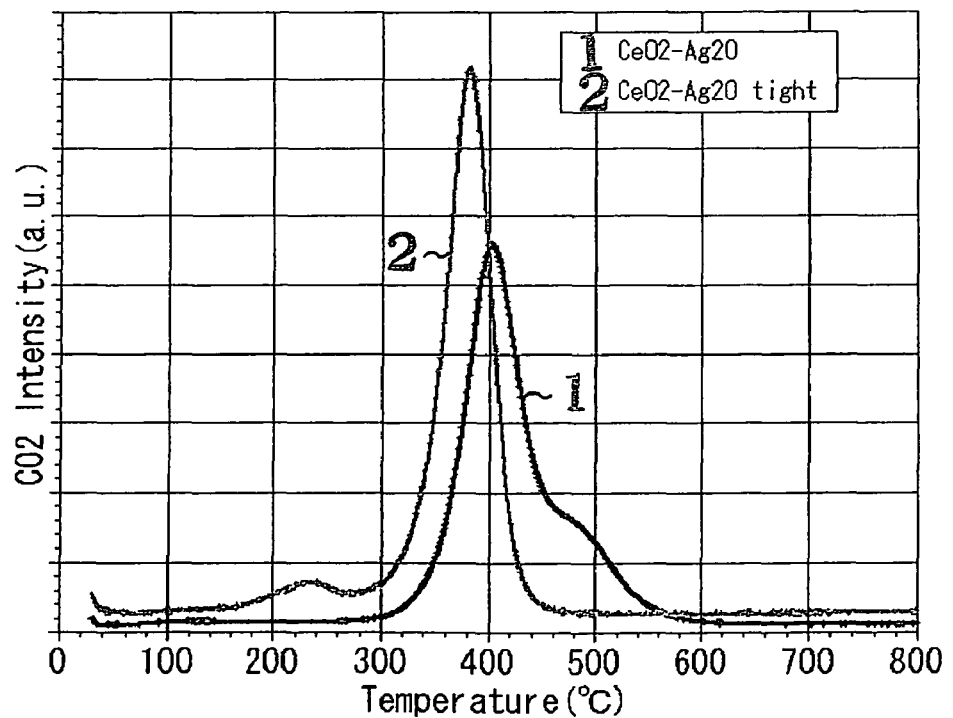
FIG. 9 is a graph showing results of $CO_2$ generation intensity evaluations using the $CeO_2$—Ag composition obtained in Example 2.

Further, Sample 1 and Sample 2 were prepared similarly to Example 1 by using the obtained $CeO_2$—Ag20, and then were each subjected to the measurement of $CO_2$ generation intensity upon rise in temperature. The obtained results are shown in FIG. 9. Here, in the drawing, the result of Sample 1 is indicated as "1," and the result of Sample 2 is indicated as "2." As apparent from the results shown in FIG. 9, in the case of the $CeO_2$—Ag20 of the present Example, although representing the "loose blending method," Sample 1 achieved oxidation performance equivalent to that of Sample 2 that represented the "strong blending method." Therefore, it was confirmed that strong contact equivalent to that of Sample 2 was also achieved in Sample 1. To be more specific, the chemical properties of Sample 1 and Sample 2 were completely identical; thus, it has been proven that one satisfying the morphology (conditions) according to the present invention is superior as a structure having strong contact with solid particles.

Example 3

After a nitrate solution containing Ce, Ag, and an additive component (La) was prepared so as to render a content percentage (mol %) of the additive component (La) relative to a total amount of Ce and the additive component equal to 10 mol %, a $CeO_2$—Ag-additive component composition "CeAg—La10" (a structure having strong contact with solid particles) made of Ag, ceria, and the additive component was obtained as described below. Firstly, a solution was prepared by dissolving 50.46 g of $Ce(NO_3)_3 \cdot 6H_2O$, 5.59 g of $La(NO_3)_3$, and 29.62 g of $AgNO_3$ into 120 mL of water. Next, ammonia water was prepared by diluting 38.21 g of 25% ammonia water with 100 g of water. Then, the solution prepared as described above was added to the ammonia water while being stirred (reverse precipitation), and the stirring was continued for 10 minutes. Thereafter, an aggregation process was conducted under the presence of water in a closed system for 2 hours while heating up to 120° C. at a pressure of 2 atm. After that, the obtained sediment (an aggregate precursor) was subjected to calcination for 5 hours at 500° C. in air. As a result, "CeAg—La10" (a structure having strong contact with solid particles) was obtained.

The content percentage of Ag in the obtained CeAg—La10 was evaluated similarly to Example 1, and found 47.82 mol % on a Ce+Ag+La basis and 49.96 mol % on a Ce+Ag basis. Here, the obtained CeAg—La10 was found to have a $CeO_2$ particle diameter of 12 nm and an Ag particle diameter of 28 nm.

Figure 10:
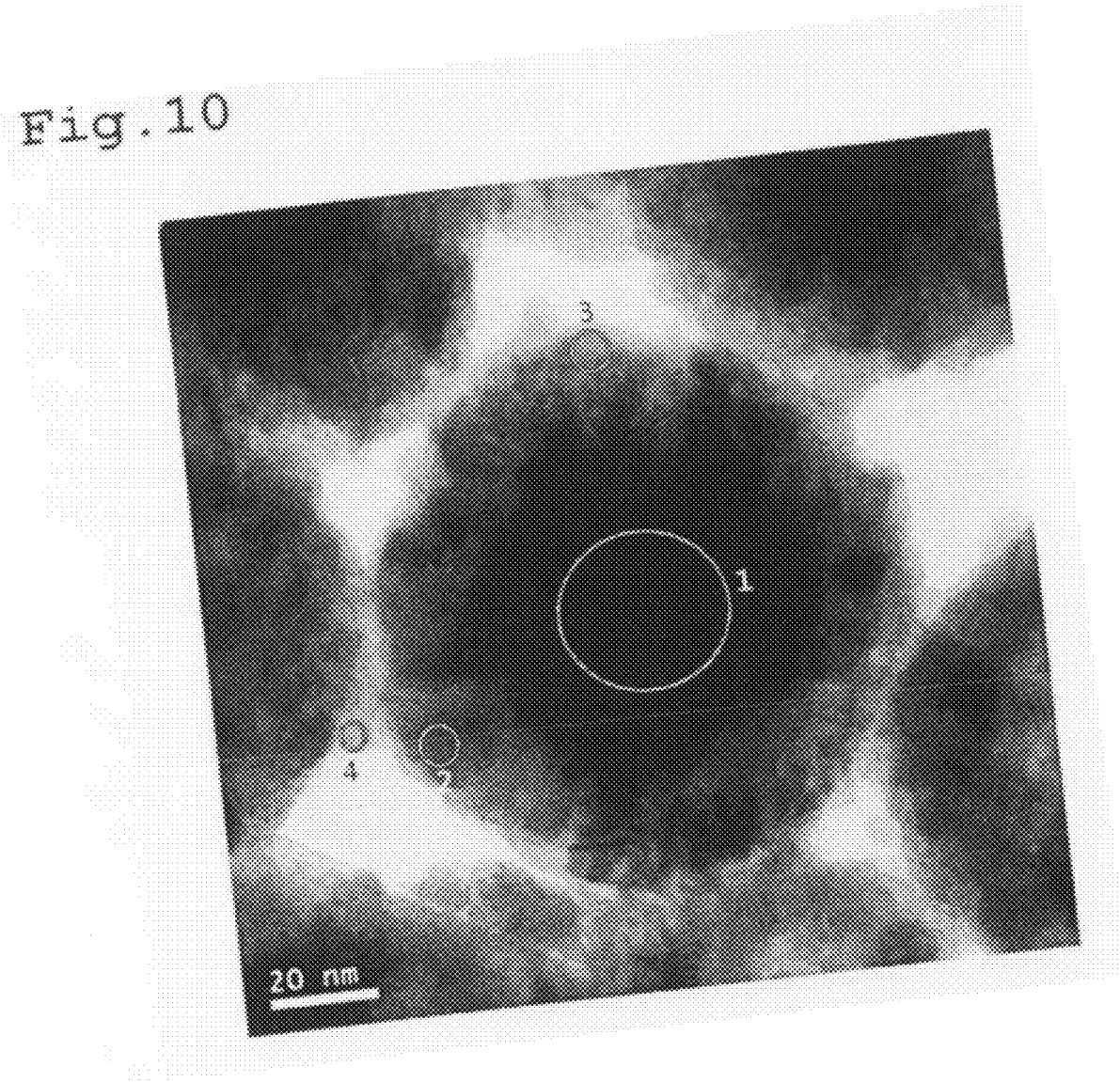
FIG. 10 is a TEM photograph showing CeAg-additive component composition obtained in Example 3.

Further, the obtained CeAg—La10 was observed by TEM. The obtained result is shown in FIG. 10. Spectra at measurement points (1 to 4) shown in FIG. 10 were obtained by the energy dispersive X-ray spectroscopy, and the numbers of counts of the contained components (Ce and Ag) were obtained to calculate elemental compositions at the respective measurement points. The contents of Ag were found to be 1: 79.05 mol %; 2: 12.69 mol %; 3: 9.92 mol %; and 4: 4.95 mol %. Although no Ag particle was detectable by the TEM in $CeO_2$ portions, these portions were proven to contain Ag. Therefore, it was confirmed that Ag particulates were also present on $CeO_2$. The present inventors speculate that the Ag was supported in the form of ultrafine particles, when $[Ag(NH_3)_2]^+$ was reduced by $Ce(OH)_3$.

The pore volume and pore diameter distribution of the obtained CeAg—La10 were measured similarly to Example 1. It was found that the volume of all the pores was 0.17 cc/g, and the volume of pores having pore diameters in a range from 0.01 to 1.0 µm was 0.16 cc/g. Here, the range of void pores formed by the aggregates was from 0.05 to 0.15 µm and the average diameter of the void pores was 0.1 µm. Hence, it was confirmed that the volume of void pores having pore diameters in a range from 0.05 to 0.15 µm that represents the range within ±50% away from the average diameter of the void pores accounted for 80% of the total volume of the void pores. Moreover, it was also confirmed that the volume of pores having pore diameters in a range from 0.05 to 0.5 µm accounted for 85% of the volume of all the pores.

Further, Sample 1 and Sample 2 were prepared similarly to Example 1 by using the obtained CeAg—La10, and then were each subjected to the measurement of $CO_2$ generation intensity upon rise in temperature. As a result, in the case of the CeAg—La10 of the present Example, although representing the "loose blending method," Sample 1 achieved oxidation performance equivalent to that of Sample 2 that represented the "strong blending method." Therefore, it was confirmed that strong contact equivalent to that of Sample 2 was also achieved in Sample 1. To be more specific, the chemical properties of Sample 1 and Sample 2 were completely identical; thus, it has been proven that one satisfying the morphology (conditions) according to the present invention is superior as a structure having strong contact with solid particles.

<Heat Endurance Test>

The CeAg—La10 obtained in Example 3 was held at 800° C. for 5 hours in an $O_2$ 10%/$N_2$ balanced atmosphere. The void pore distribution of the CeAg—La10 was maintained even after this endurance test at 800° C.; therefore, it was confirmed that the function as a structure having strong contact with solid particles was maintained.

<Test 1 Using DPF>

(i) Preparation of Test Piece

The CeAg—La10 obtained in Example 3 was coated on DPF (made of cordierite, porosity 65%, average pore diameter 30 µm) in a test piece size (35 ml) in accordance with a coating method described below.

A sediment (an aggregate) obtained after the inverse precipitation and aggregation process was collected by centrifugation. Slurry having the concentration of 15% by mass was obtained by adding water to the sediment. Subsequently, the slurry was caused to contact the DPF so as to enter the pores thereof. After application of suction in this state, the DPF was subjected to calcination for 1 hour at 500° C. in air. The process was repeated until a support amount (coverage) reaches 130 g/L to obtain a substrate having strong contact with solid particles (a test piece) comprising DPF coated with the CeAg—La10. An advantage of this method is that the sediment is sintered at the time of calcination, and thereby functions as a binder itself. Accordingly, it is possible to form coating that consists of only components effective for soot oxidation. Here, the contact was carried out in this coating method without application of ultrasound; however, it may be carried out with application of ultrasound.

Figure 11:
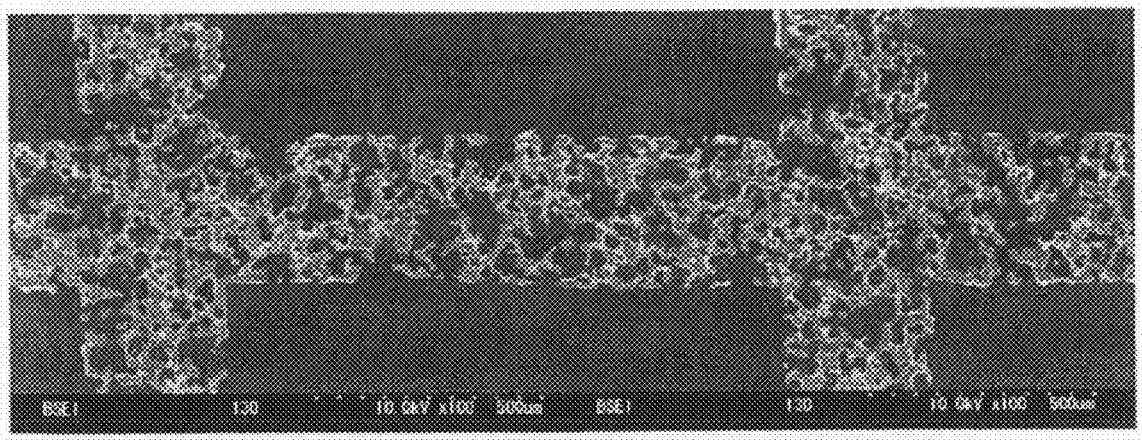
FIG. 11 is an SEM photograph showing a cross section of a substrate having strong contact with solid particles obtained in Example 3.

(ii) Evaluation of a Cross Section of a Substrate Having Strong Contact with Solid Particles The obtained substrate having strong contact with solid particles was buried into a resin, and subjected to cross-sectional observation by SEM after cutting out a cross section. The obtained result is shown in FIG. 11. As apparent from the result shown in FIG. 11, it was confirmed that there was no blockage of pores in the obtained substrates and that the substrate was uniformly covered with the structure having strong contact with solid particles through the entire part including the inside of the pores of the substrate. Here, a white portion in the drawing is the CeAg—La catalyst and a gray portion is the cordierite substrate.

Figure 12:
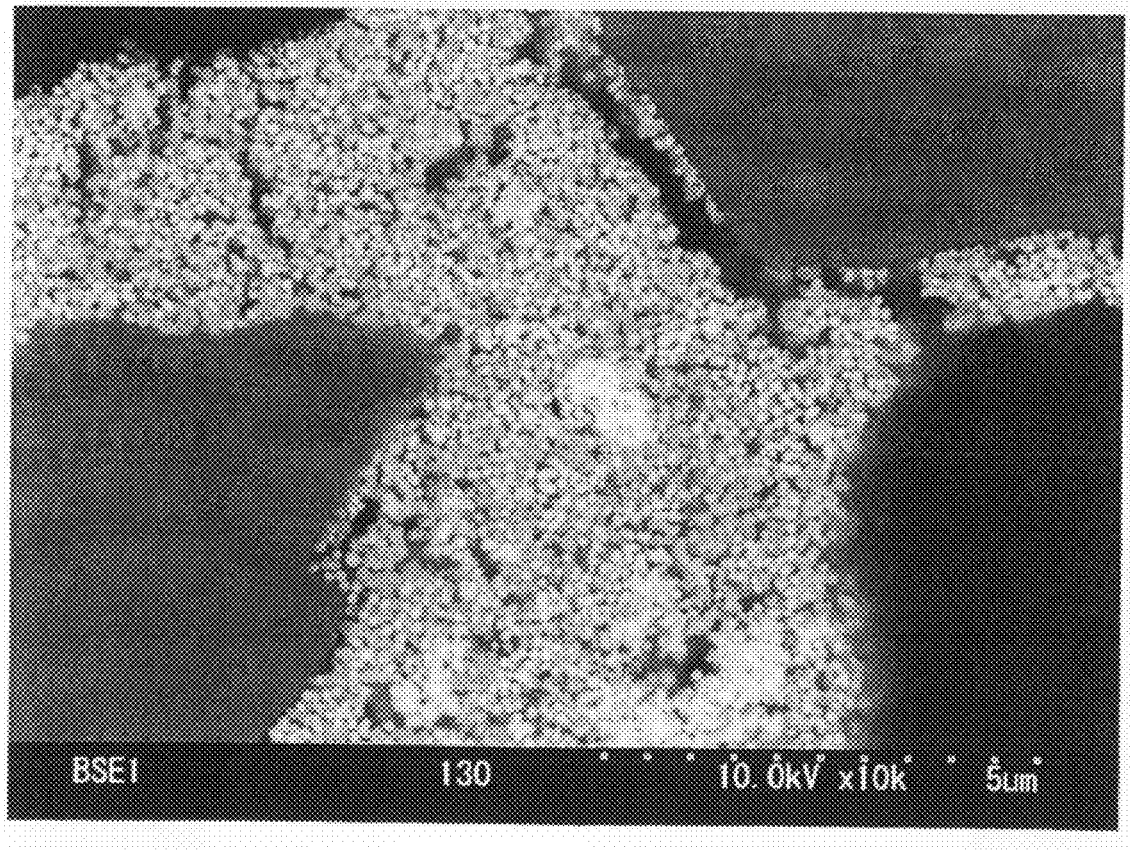
FIG. 12 is an SEM photograph showing an enlarged cross section of the substrate having strong contact with solid particles obtained in Example 3.

In addition, a photograph obtained by further enlarging the above SEM photograph is shown in FIG. 12. As apparent from the result shown in FIG. 12, it was confirmed that aggregates each having a particle diameter of approximately 0.1 μm were distributed on the substrate, and that the aggregates formed a structure, in which a higher-order aggregate (an assembly) is formed by the secondary aggregation of the aggregates, throughout the inside of the pores of the substrate. When the individual spherical particles shown in FIG. 12 were enlarged, it was confirmed that they were formed by aggregation of the primary particles as shown in the TEM photograph shown in FIG. 10. Moreover, when pore diameter distribution was measured in the coated portions, it was confirmed that the result, except for pores derived from the substrate, was similar to the result in the above-described CeAg—La10.

Figure 13:
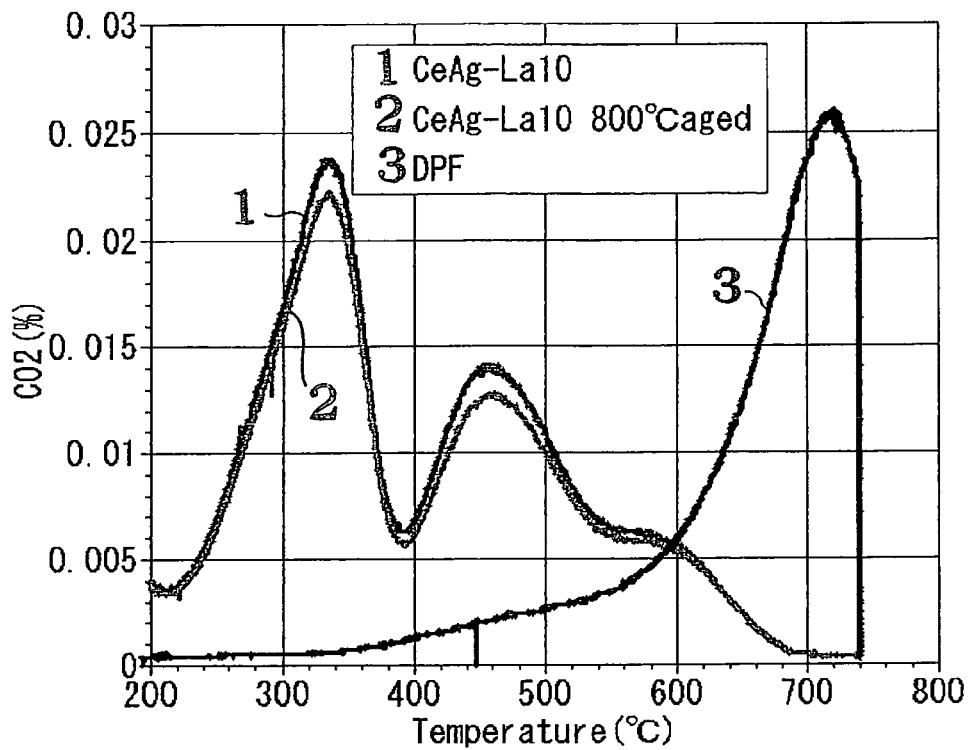
FIG. 13 is a graph showing results of soot oxidation performance test 1 using the substrates having strong contact with solid particles obtained in Example 3.

(iii) Evaluation of Oxidation Performance and Contact of Substrate Having Strong Contact with Solid Particles Using the test piece, it was configured to remove unburned hydrocarbon components by depositing PMs in exhaust gas from a diesel engine at 200° C. at approximately 2 g/L, and then maintaining a $N_2$ atmosphere for 15 minutes at 500° C. Thereafter, the test piece was heated at a temperature rise rate of 20° C./min in an atmosphere containing 10% of $O_2$ at a flow rate of 30 L/min. The soot oxidation performance was subjected to comparison on the basis of $CO_2$ peaks at this time. The obtained result is shown in FIG. 13. Here, the CeAg—La10 after the 800° C. endurance test was also evaluated similarly. Moreover, for comparison, DPF without CeAg—La10 coating was also evaluated similarly.

As apparent from the results shown in FIG. 13, it was confirmed that, while "DPF" without CeAg—La10 coating had a peak around 700° C., the DPF coated with the structure having strong contact with solid particles of the present invention allowed the oxidation temperature to be largely decreased. Since good contact with solid particles is a prerequisite for catalytic effect to be expressed, this result indicates that the structure having strong contact with solid particles of the present invention achieves strong contact. In addition, it was confirmed that this strong contact was maintained even after the endurance test at 800° C.

<Test 2 Using DPF>

The CeAg—La10 obtained in Example 3 was coated on DPFs, similarly to Example 1 except for using DPFs having a porosity of 60%, so as to render the supported amount (coated amount) of the CeAg—La10 equal to 42 g/L, 76 g/L, 104 g/L, and 134 g/L, respectively.

Figure 14:
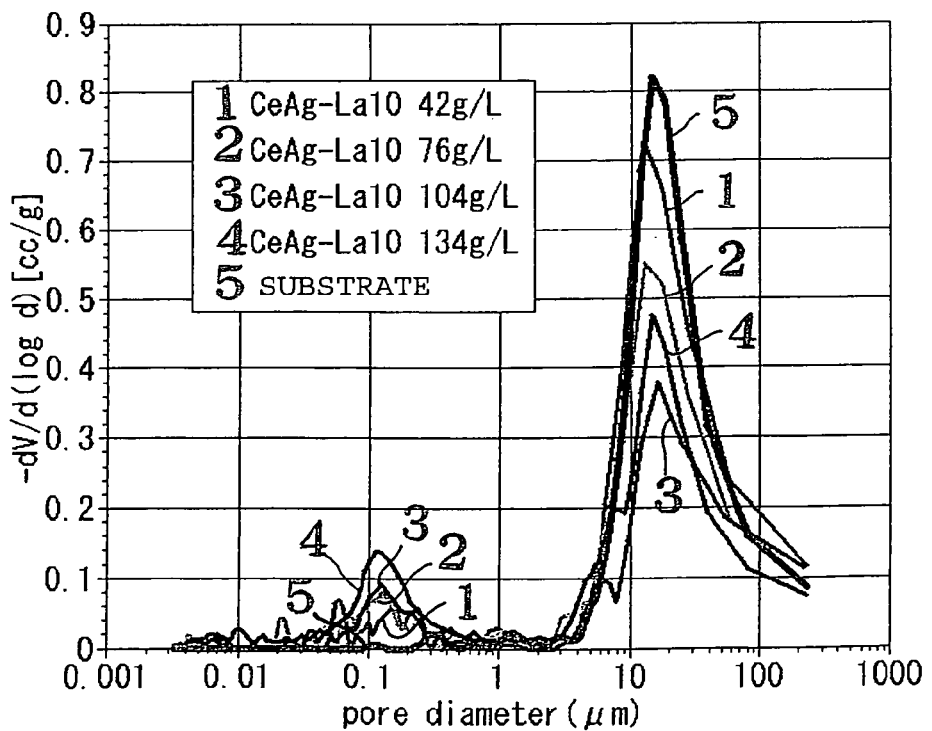
FIG. 14 is a graph showing pore diameter distribution of the substrates having strong contact with solid particles obtained in Example 3.
Figure 15:
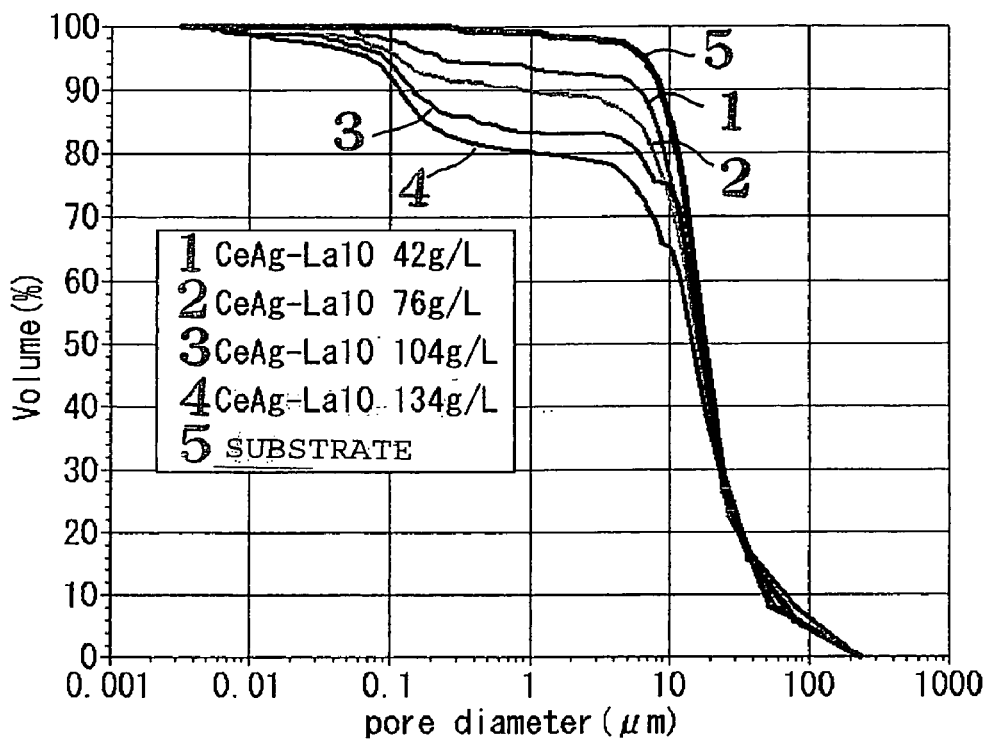
FIG. 15 is a graph showing pore diameter distribution (accumulated total) of the substrates having strong contact with solid particles obtained in Example 3.

The pore volumes and pore diameter distributions of the obtained substrates having strong contact with solid particles were measured similarly to Example 1. The obtained results are shown in FIG. 14 and FIG. 15 (FIG. 15 shows distributions of accumulated total volume). In FIG. 14, the peak around 0.1 to 0.3 μm corresponds to void pores of the structure having strong contact with solid particles, while a peak around 10 to 30 μm corresponds to pores of the substrate. According to the results shown in FIG. 14 and FIG. 15, it was confirmed that the proportion of void pores in the structure having strong contact with solid particles among all the pores in the substrate having strong contact with solid particles was in a range from 1 to 50% by volume, and that the proportion was larger when the coating amount was larger (6.9% for 42 g/L, 10.3% for 76 g/L, 16.6% for 104 g/L, and 19.73% for 134 g/L).

Figure 16:
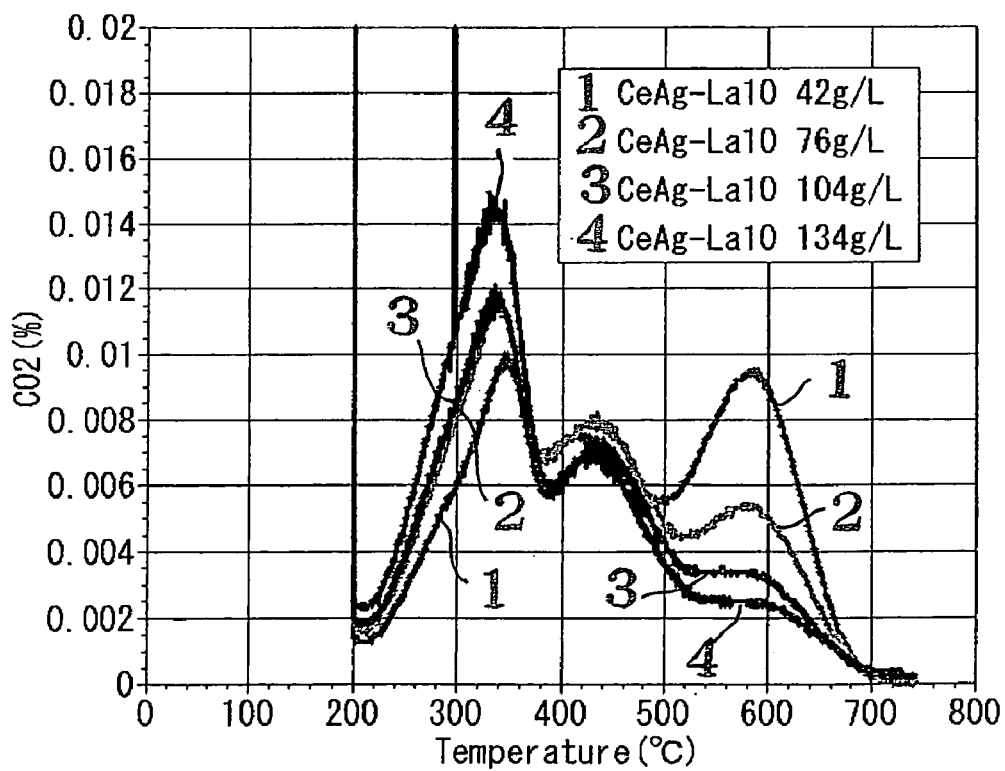
FIG. 16 is a graph showing results of a soot oxidation performance test 2 using the substrates having strong contact with solid particles obtained in Example 3.

The oxidation performance and contact of the obtained substrates having strong contact with solid particles were evaluated similarly to Test 1 using DPF except for depositing PMs in exhaust gas from a diesel engine at 200° C. at approximately 1 g/L. The obtained results are shown in FIG. 16. As apparent from the results shown in FIG. 16, a peak around 600° C. decreased and a peak around 300° C. increased when the coating amount was larger. Therefore, it was confirmed that contact was increased when the proportion of the void pores in the structure having strong contact with solid particles was larger.

Example 4

A $CeO_2$—Ag support material "Ag(15)/$CeO_2$-1" (a structure having strong contact with solid particles) was obtained by allowing high specific surface area $CeO_2$ to support Ag so as to render a content percentage (mol %) of Ag relative to the total amount of Ce and Ag equal to 15 mol % in accordance with the following method.

<Method of Allowing Ag to be Supported>

$AgNO_3$ and high specific surface area $CeO_2$ were weighed to satisfy a molar ratio of 15:85. Water was added to a mixture of both of these substances, and $AgNO_3$ was dissolved therein. Subsequently, the obtained fluid dispersion was heated and stirred with a stirrer, then subjected to evaporation to dryness, and then calcined for 5 hours at 500° C. in air to obtain a $CeO_2$—Ag support material.

Figure 17:
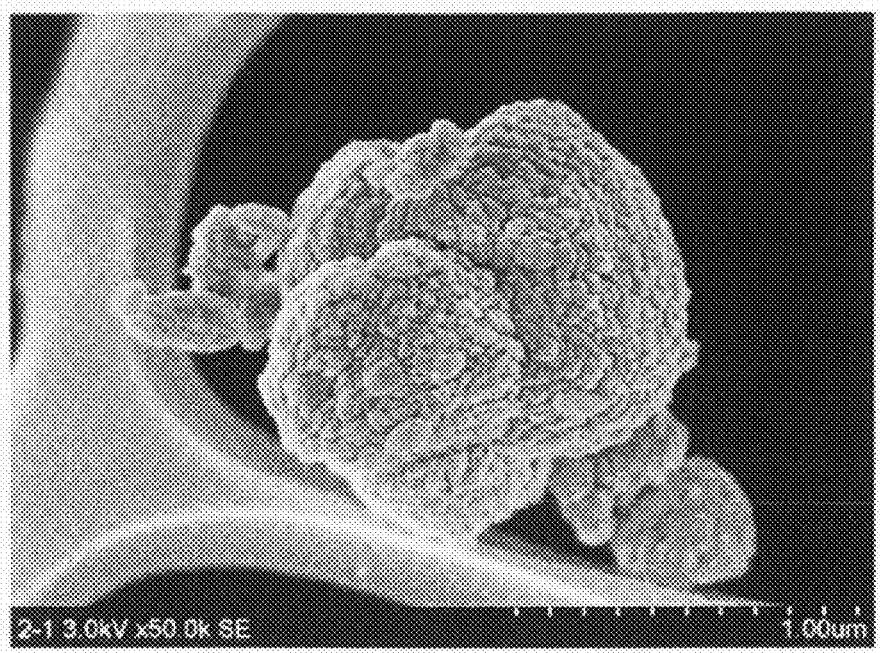
FIG. 17 is an SEM photograph showing a surface state of a $CeO_2$—Ag support material obtained in Example 4.

The surface state of the obtained Ag(15)/$CeO_2$-1 was observed by SEM. The obtained result is shown in FIG. 17. As apparent from the result shown in FIG. 17, no coarse Ag particle was observed because its amount was small, although Ag was supported. By taking a reflection electron image, it was confirmed that Ag was supported extremely thinly and uniformly on the $CeO_2$ surface. According to this result, it was confirmed that the $CeO_2$ particulates supporting Ag thinly thereon formed aggregates, and the aggregates further formed a high-order aggregate (an assembly).

Figure 18:
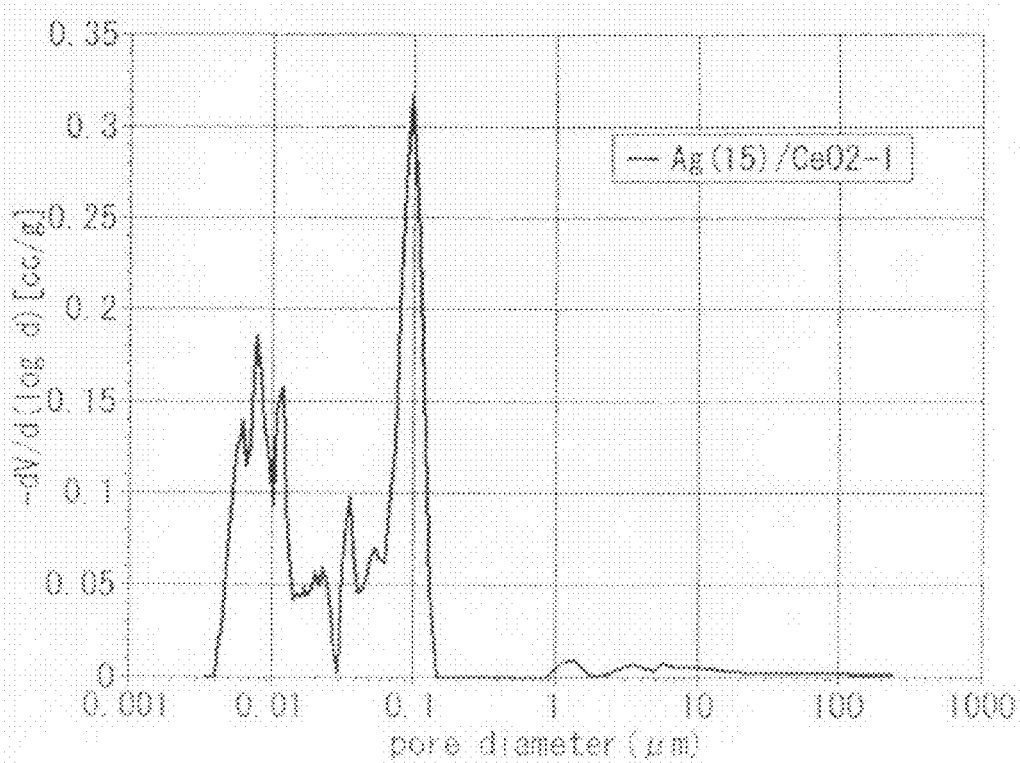
FIG. 18 is a graph showing pore diameter distribution of the $CeO_2$—Ag support material obtained in Example 4.
Figure 19:
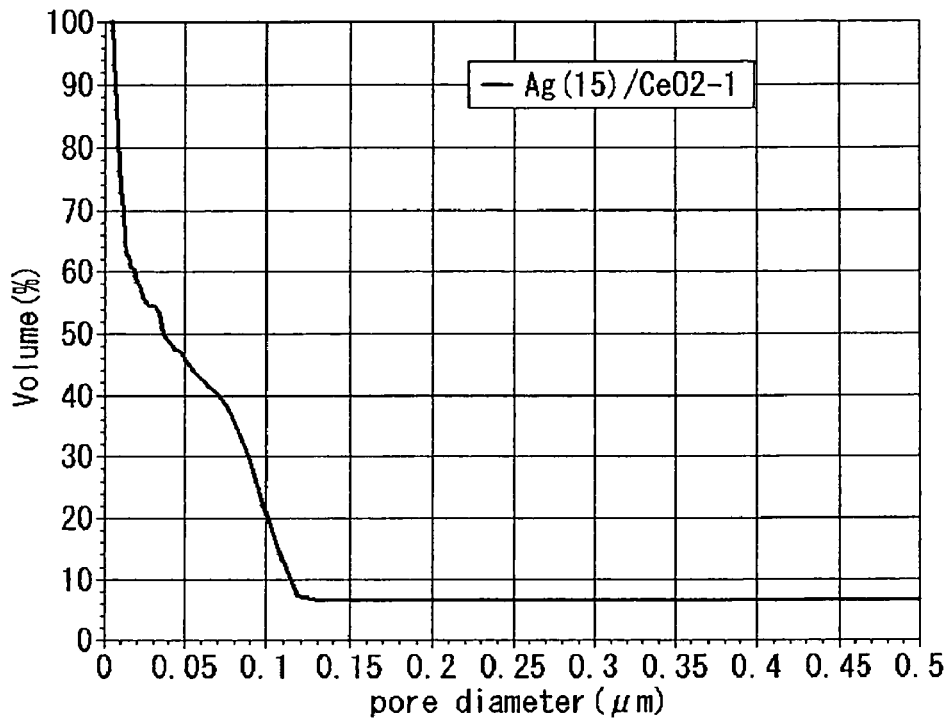
FIG. 19 is a graph showing pores size distribution (accumulated total) of the $CeO_2$—Ag support material obtained in Example 4.

In addition, The pore volume and pore diameter distribution of the obtained Ag(15)/$CeO_2$-1 were measured similarly to Example 1. The obtained results are shown in FIG. 18 and FIG. 19 (FIG. 19 shows distribution of accumulated total volume). As a result, it was found that the volume of all the pores was 0.16 cc/g, and the volume of pores having pore diameters in a range from 0.01 to 1.0 μm was 0.11 cc/g. Here, the range of void pores formed by the aggregates was from 0.02 to 0.2 μm, and the average diameter of the void pores was 0.1 μm. Therefore, according to the result shown in FIG. 19, it was confirmed that the volume of void pores having pore diameters in a range from 0.05 to 0.15 μm that represents the range within ±50% away from the average diameter of the void pores accounted for 71% of the total volume of the void pores. Further, it was also confirmed that the volume of pores having pore diameters in a range from 0.05 to 0.5 μm accounted for 38% of the volume of all the pores. Here, the primary particle diameter measured by XRD was $CeO_2$ 12 nm. Hence, it was confirmed that the void pores observed near 0.01 μm in the mercury porosimeter measurement was attributed to the primary particles.

Figure 20:
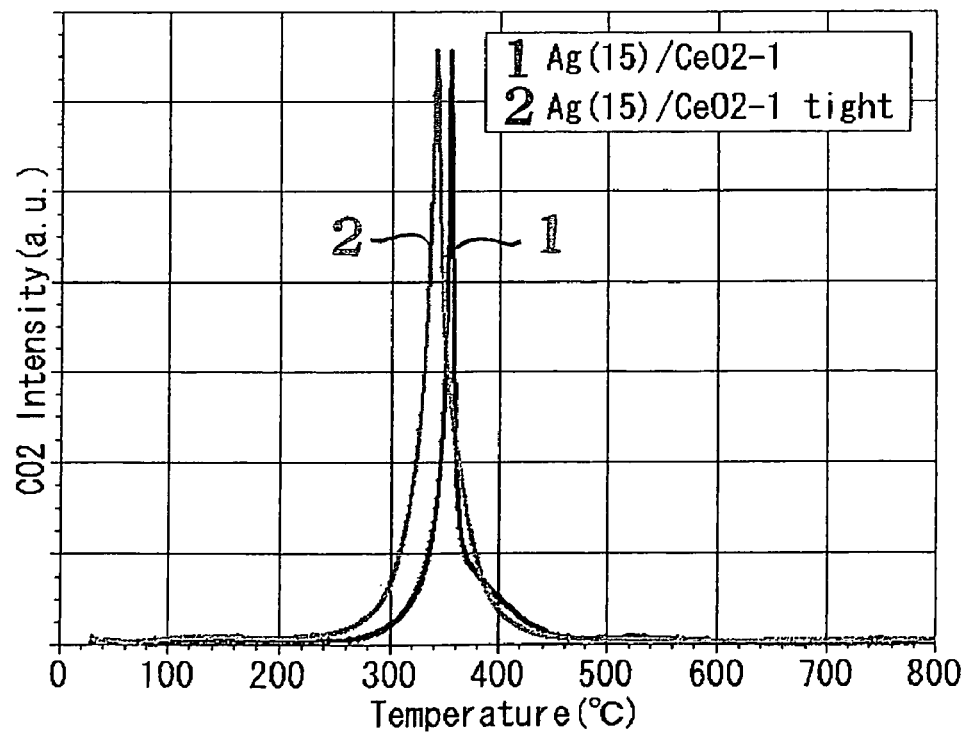
FIG. 20 is a graph showing results of $CO_2$ generation intensity evaluations using the $CeO_2$—Ag support material obtained in Example 4.

Sample 1 and Sample 2 were prepared using the obtained Ag(15)/$CeO_2$-1 similarly to Example 1, and then were each subjected to the measurement of $CO_2$ generation intensity upon rise in temperature. The obtained results are shown in FIG. 20. Here, in the drawing, the result of Sample 1 is indicated as "1," and the result of Sample 2 is indicated as "2." As apparent from the results shown in FIG. 20, in the case of the $CeO_2$—Ag20 of the present Example, although representing the "loose blending method," Sample 1 achieved oxidation performance equivalent to that of Sample 2 that represented the "strong blending method." Therefore, it was confirmed that strong contact equivalent to that of Sample 2 was also achieved in Sample 1. To be more specific, the chemical properties of Sample 1 and Sample 2 were completely identical; thus, it has been proven that one satisfying the morphology (conditions) according to the present invention is superior as a structure having strong contact with solid particles.

Comparative Example 1

In this Comparative Example, a $CeO_2$—Ag composition "$CeO_2$—Ag75 filter" was prepared in accordance with the preparation method disclosed in Japanese Unexamined Patent Application Publication 2004-42021. Specifically, a 0.1 M solution was prepared so as to satisfy a molar ratio of Ce:Ag=25:75. A cellulose material (Whatman (registered trademark) Filter Paper 540) was impregnated with the solution, and then incinerated for 2 hours at 600° C. to be removed.

It was found that the obtained $CeO_2$—Ag75 filter has a $CeO_2$ particle diameter of 20 nm and an Ag particle diameter of 70 nm.

Figure 21:
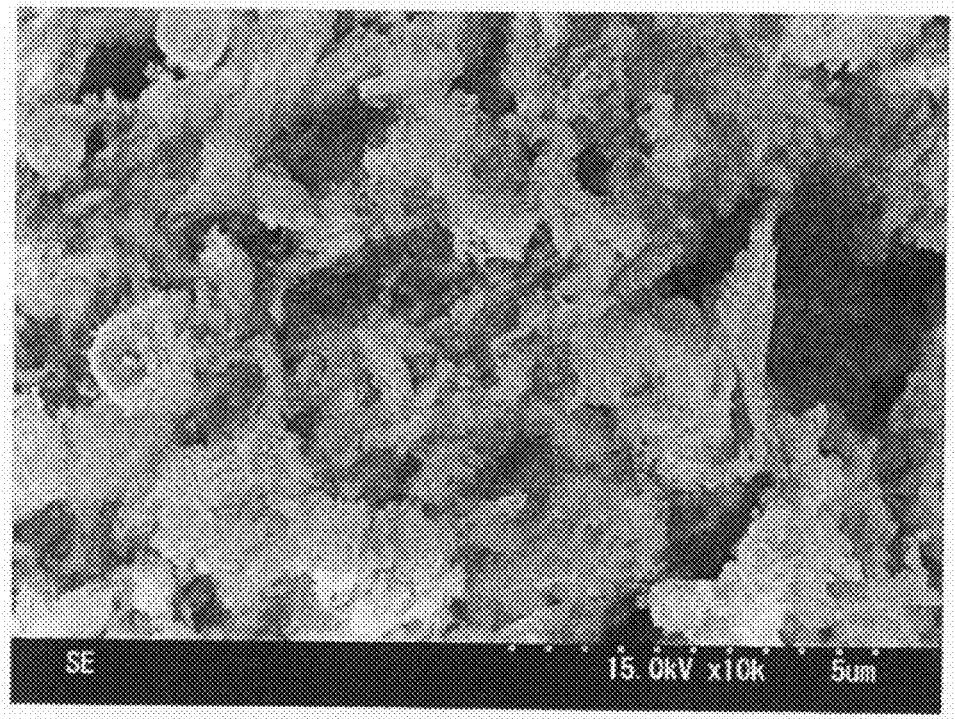
FIG. 21 is an SEM photograph showing a surface state of a $CeO_2$—Ag composition obtained in Comparative Example 1.

Further, the surface state of the obtained $CeO_2$—Ag75 filter was observed by SEM. The obtained result is shown in FIG. 21. As apparent from the result shown in FIG. 21, it was confirmed that aggregates in the $CeO_2$—Ag75 filter were not controlled, and, as a result, the sizes of the void pores were not controlled.

Figure 22:
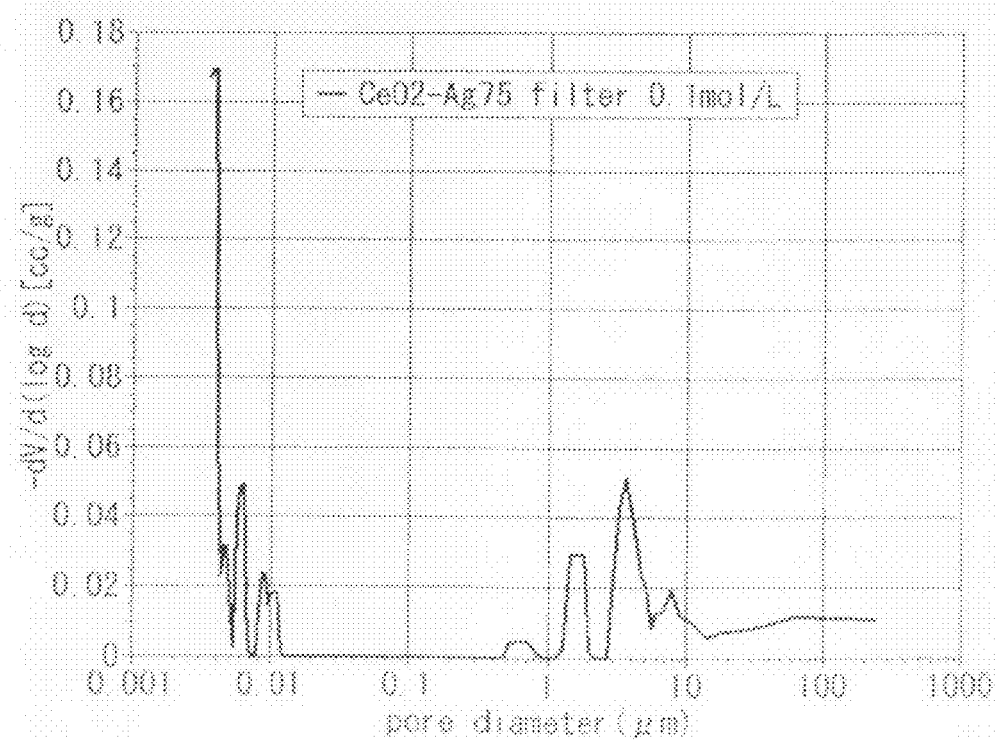
FIG. 22 is a graph showing pore diameter distribution of the $CeO_2$—Ag composition obtained in Comparative Example 1.
Figure 23:
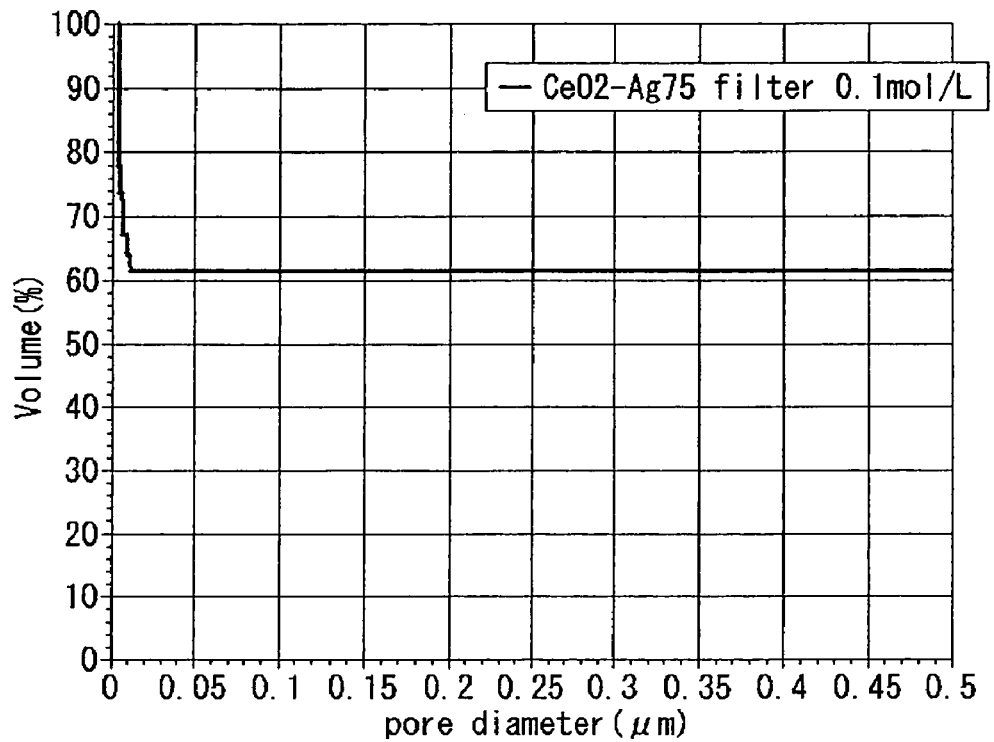
FIG. 23 is a graph showing pore diameter distribution (accumulated total) of the $CeO_2$—Ag composition obtained in Comparative Example 1.

The pore volume and pore diameter distribution of the obtained $CeO_2$—Ag75 filter were measured similarly to Example 1. The obtained results are shown in FIG. 22 and FIG. 23 (FIG. 23 shows distribution of accumulated total volume). As a result, it was found that the volume of all the pores was 0.05 cc/g, and the volume of pores having pore diameters in a range from 0.01 to 1.0 μm was 0.00 cc/g. In addition, in the measurement by use of a mercury porosimeter, although pores corresponding to the primary particles of $CeO_2$ were observed, there was no void pore attributable to aggregation of the aggregates. Hence, it was confirmed that the $CeO_2$—Ag75 filter apparently does not correspond to the structure having strong contact with solid particles of the present invention.

Figure 24:
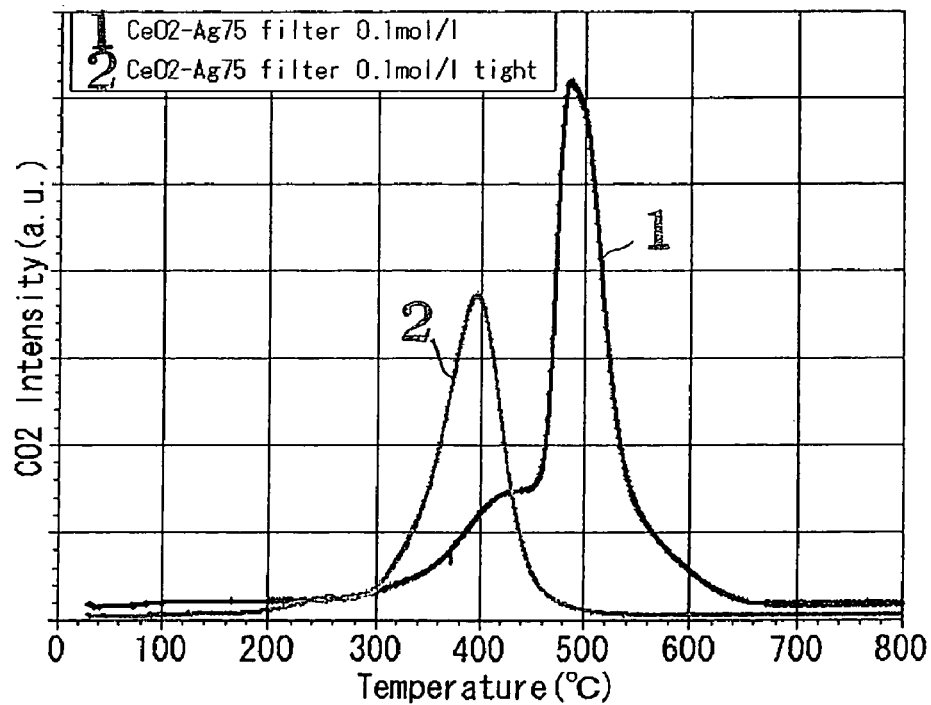
FIG. 24 is a graph showing results of $CO_2$ generation intensity evaluations using the $CeO_2$—Ag composition obtained in Comparative Example 1.
Figure 25:
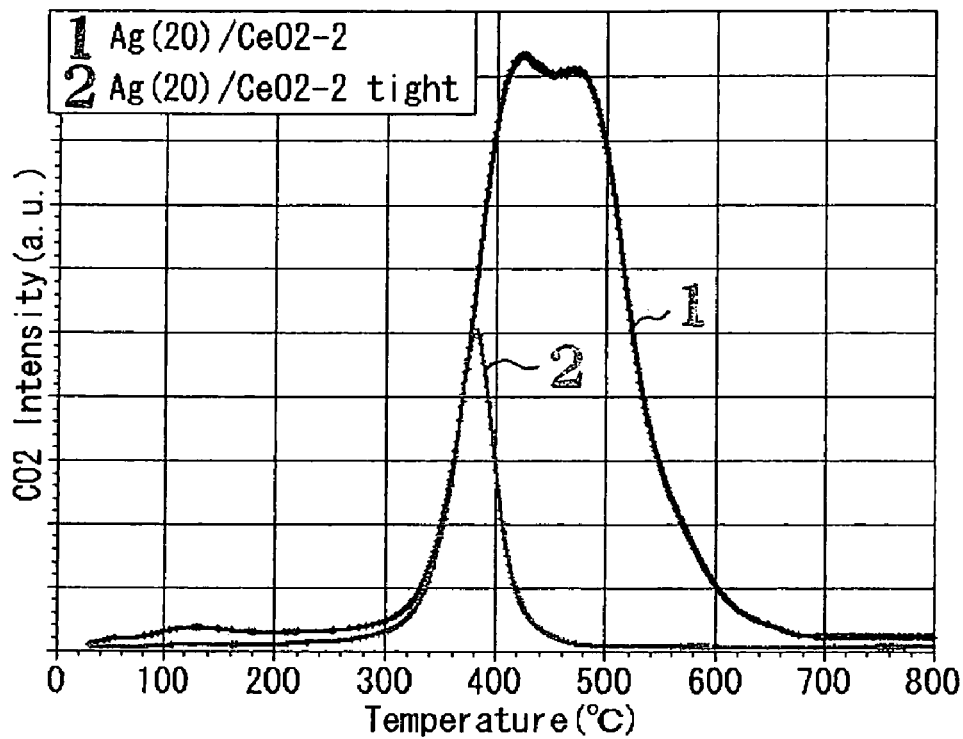
FIG. 25 is a graph showing results of $CO_2$ generation intensity evaluations using the $CeO_2$—Ag support material obtained in Comparative Example 2.
Figure 26:
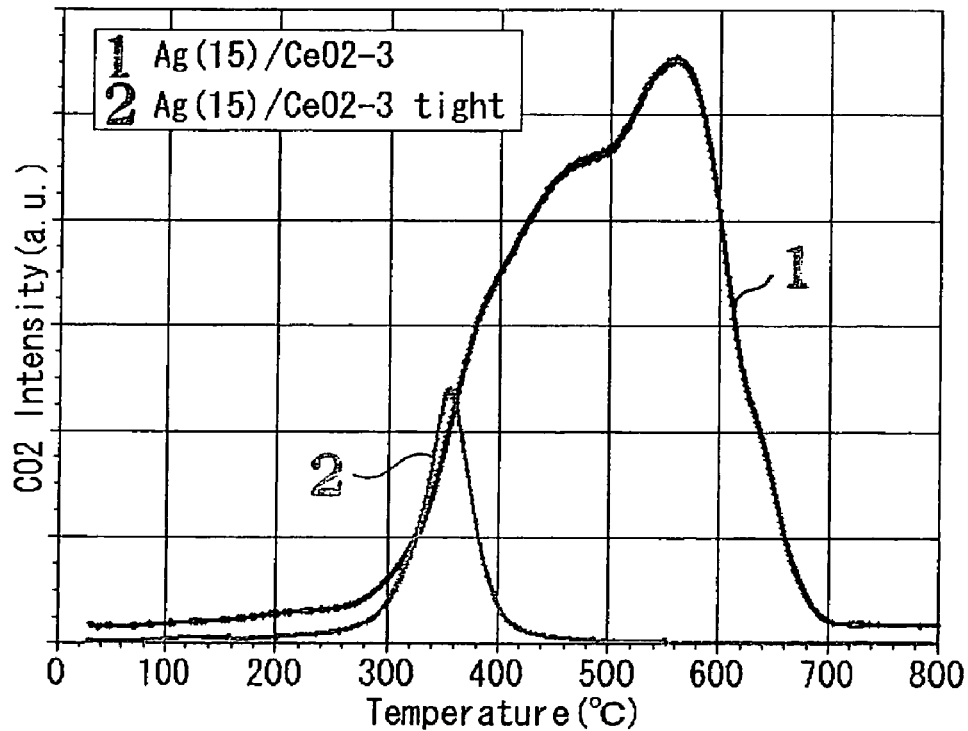
FIG. 26 is a graph showing results of $CO_2$ generation intensity evaluations using the $CeO_2$—Ag support material obtained in Comparative Example 3.
Figure 27:
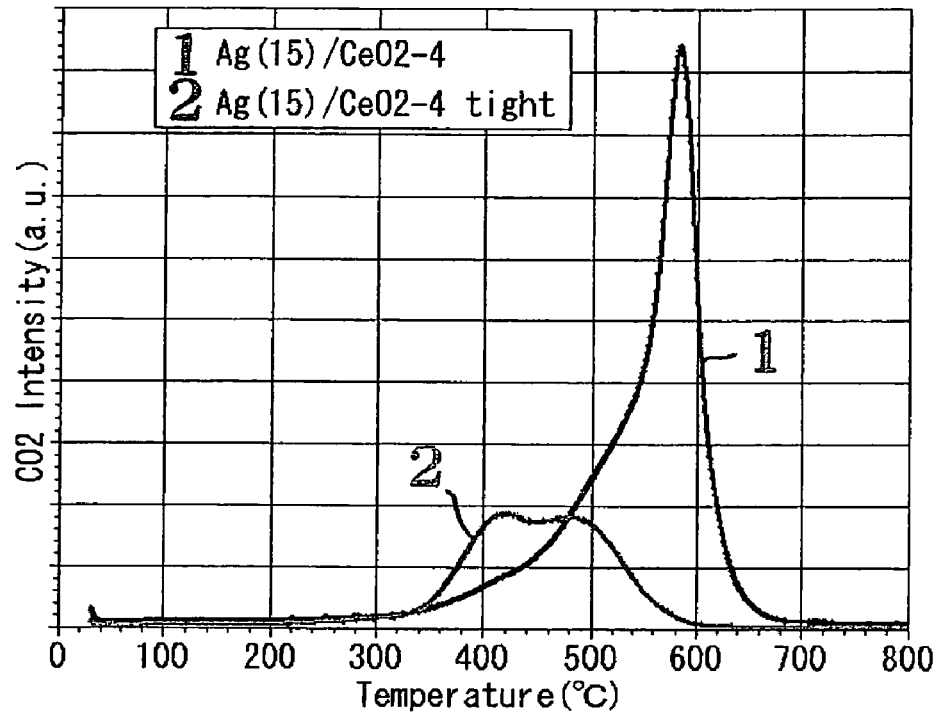
FIG. 27 is a graph showing results of $CO_2$ generation intensity evaluations using the $CeO_2$—Ag support material obtained in Comparative Example 4.
Figure 28:
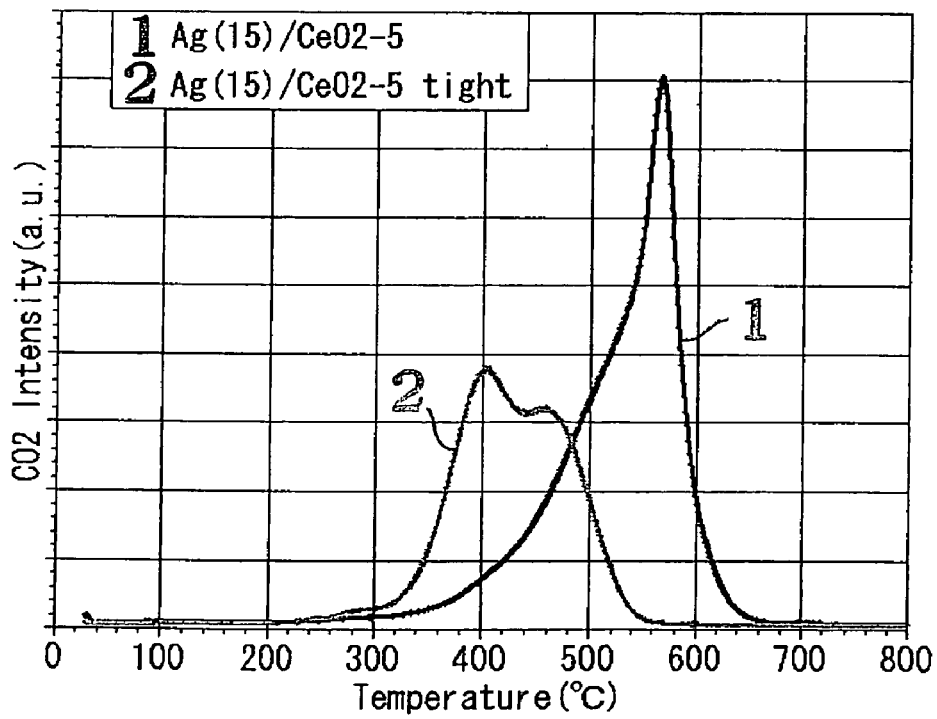
FIG. 28 is a graph showing results of $CO_2$ generation intensity evaluations using the $CeO_2$—Ag support material obtained in Comparative Example 5.

Further, Sample 1 and Sample 2 were prepared using the obtained $CeO_2$—Ag75 filter similarly to Example 1, and were each subjected to the measurement of $CO_2$ generation intensity upon rise in temperature. The obtained results are shown in FIG. 24. Here, in the drawing, the result of Sample 1 is indicated as "1," and the result of Sample 2 is indicated as "2." As apparent from the results shown in FIG. 24, in the case of the $CeO_2$—Ag75 filter of the present Comparative Example in which aggregation was not controlled, there was a big difference in oxidation performance between Sample 1 that represented the "loose blending method" and Sample 2 that represented the "strong blending method," in spite of the fact that the chemical properties therebetween were perfectly identical. Hence, it was confirmed that contact of Sample 1 was largely inferior to contact of Sample 2.

Comparative Examples 2 to 5

In these Comparative Examples, $CeO_2$—Ag support material "Ag(20)/$CeO_2$-2 (Comparative Example 2)," "Ag(15)/$CeO_2$-3 (Comparative Example 3)," "Ag(15)/$CeO_2$-4 (Comparative Example 4)," and "Ag(15)/$CeO_2$-5 (Comparative Example 5)" were prepared similarly to Example 5 except for using the following $CeO_2$-2 to $CeO_2$-5 instead of the high specific surface area $CeO_2$ by allowing Ag to be supported so as to render the content percentage (mol %) of Ag relative to a total amount of Ce and Ag equal to 20 mol % (Comparative Example 2) or 15 mol % (Comparative Examples 3 to 5).

<$CeO_2$-2>

This is $CeO_2$ obtained as described below in accordance with a precipitation method. Specifically, a cerium nitrate solution was dropped into $NH_3$ water. The obtained precipitate was collected by centrifugation, and subjected to calcination at 500° C. for 5 hours in air to obtain $CeO_2$.

<$CeO_2$-3>

This is $CeO_2$ obtained as described below in accordance with a hydrolytic method based on the method described in Japanese Unexamined Patent Application Publication No. Hei 6-72711. Specifically, an ammonium cerium nitrate solution was dropped into water being heated to reflux. The obtained precipitate was collected by filtration, washed with ethanol, and subjected to calcination at 500° C. for 5 hours in air to obtain $CeO_2$.

<$CeO_2$-4>

Made by Wako Pure Chemical Industries, Ltd., product name: 034-01885 special grade <$CeO_2$-5>

Made by Kojundo Chemical Laboratory, Co., Ltd, Product name: 3N CEO 03PP.

These $CeO_2$—Ag support materials were subjected to SEM observation, and it was confirmed that aggregates were not controlled, and, as a result, the sizes of void pores were not controlled in all of these $CeO_2$—Ag support materials. These $CeO_2$—Ag support materials were subjected to the measurements of pore volume and pore diameter distribution similarly to Example 1. As a result, it was confirmed that all of these $CeO_2$—Ag support materials clearly did not correspond to a structure having strong contact with solid particles of the present invention.

Sample 1 and Sample 2 were prepared using these $CeO_2$—Ag support materials similarly to Example 1, and were each subjected to the measurement of $CO_2$ generation intensity upon rise in temperature. The obtained results are shown in FIG. 25 to FIG. 28. Here, in the drawing, the results of Sample 1 are indicated as "1," and the results of Sample 2 are indicated as "2." As apparent from the results shown in FIG. 25 to FIG. 28, in the case of the $CeO_2$—Ag support materials of the present Comparative Examples in which aggregation was not controlled, there was a big difference in oxidation performance between Sample 1 that represented the "loose blending method" and Sample 2 that represented the "strong blending method" in spite of the fact that the chemical properties therebetween were perfectly identical. Hence, it was confirmed that contact of Sample 1 was largely inferior to contact of Sample 2.

Example 5

After a nitrate solution containing Ce, Ag, and an additive component (La) was prepared so as to render a content percentage (mol %) of the additive component (La) relative to a total amount of Ce and the additive component equal to 10 mol %, a $CeO_2$—Ag—La aggregate precursor was obtained as described below. Specifically, firstly, a solution was prepared by dissolving 50.46 g of $Ce(NO_3)_3.6H_2O$, 5.59 g of $La(NO_3)_3$, and 29.62 g of $AgNO_3$ into 120 mL of water. Next, ammonia water was prepared by diluting 38.21 g of 25% ammonia water with 100 g of water. Then, the solution prepared as described above was added to the ammonia water while being stirred (reverse precipitation), and the stirring was continued for 10 minutes. Thereafter, an aggregation process was conducted under the presence of water in a closed system for 2 hours while heating up to 120° C. at a pressure of 2 atm.

Next, after the obtained sediment (an aggregate precursor) was separated by centrifugation, the aggregate precursor was dispersed in 150 ml of water, 14 ml of nitric acid (made by Wako Pure Chemical Industries, Ltd., specific gravity: 1.40, product number: 147-01346) was added thereto while stirring, and the stirring was continued at 15° C. for 30 minutes to carry out an elution treatment (an acid treatment) of Ag. Here, halt operation of the elution treatment of Ag in the present Example was carried out by adding $NH_3$ water of concentration 25% until pH=11 so that eluted Ag can completely converted to an amine complex.

The aggregate precursor thus subjected to the acid treatment was again separated by centrifugation, and then subjected to calcination at 500° C. for 5 hours in air to obtain a $CeO_2$—Ag-additive component composition "CeAg—La10" (a structure having strong contact with solid particles).

The contents of Ag in the obtained CeAg—La10 were evaluated similarly to Example 1, and it was found to be 38 mol % on a Ce+Ag basis. Here, the obtained CeAg—La10 was found to have a $CeO_2$ particle diameter of 13 nm and an Ag particle diameter 40 nm.

Figure 29:
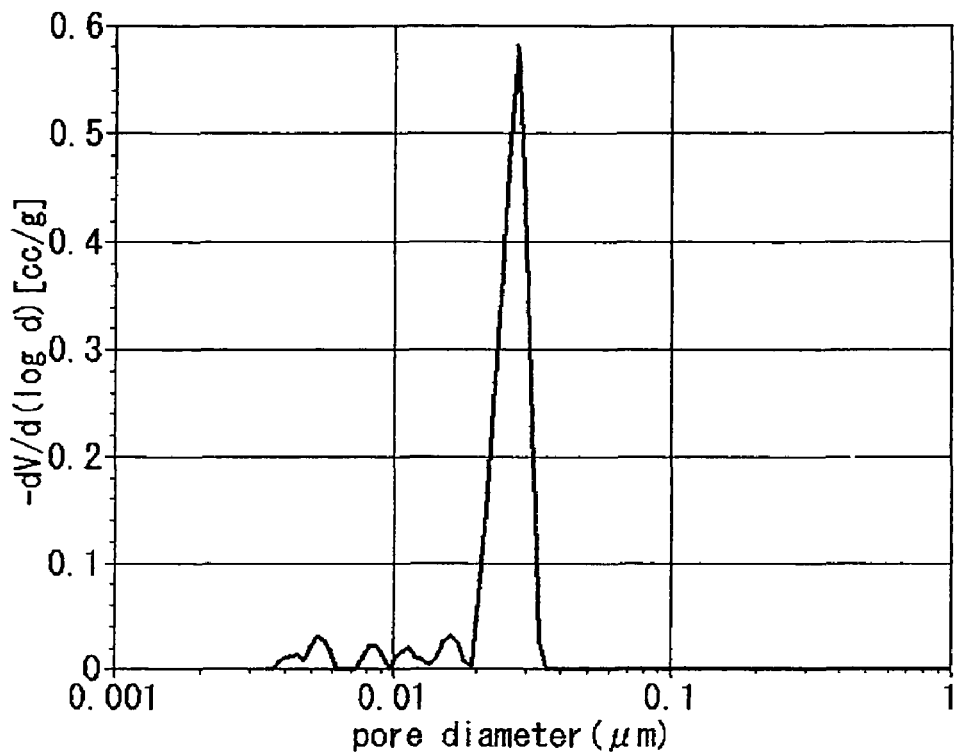
FIG. 29 is a graph showing pore diameter distribution of the CeAg-additive component composition obtained in Example 5.
Figure 30:
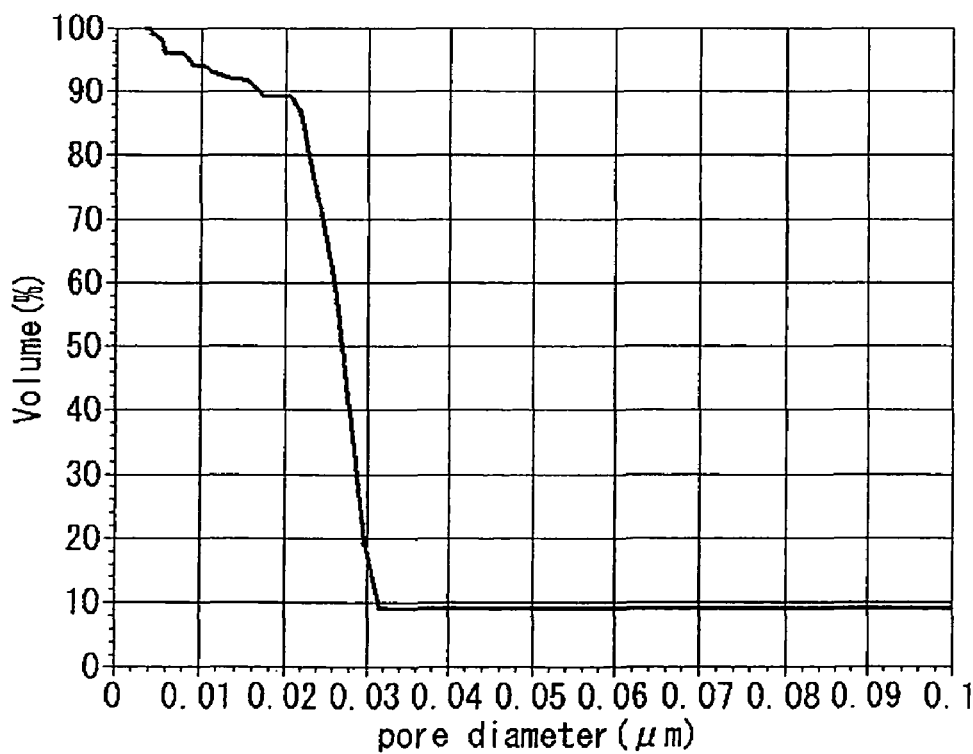
FIG. 30 is a graph showing pore diameter distribution (accumulated total) of the CeAg-additive component composition obtained in Example 5.

Further, the pore volume and pore diameter distribution of the obtained CeAg—La10 were measured similarly to Example 1. The obtained results are shown in FIG. 29 and FIG. 30 (FIG. 30 shows distribution of accumulated total volume). As a result, it was found that the volume of all the pores was 0.09 cc/g, and the volume of pores having pore diameters in a range from 0.01 to 1.0 μm was 0.075 cc/g. Here, the range of void pores formed by the aggregates was from 0.01 to 0.035 μm, and the average diameter of the void pores was 0.028 μm. Hence, according to the result shown in FIG. 30, it was confirmed that the volume of void pores having pore diameters in a range from 0.014 to 0.042 μm that represents the range of the average diameter within ±50% away from the average diameter of the void pores accounted for 81% of the total volume of the void pores. Moreover, it was also confirmed that the volume of pores having pore diameters in a range from 0.01 to 0.5 μm accounted for 83% of the volume of all the pores.

Figure 31:
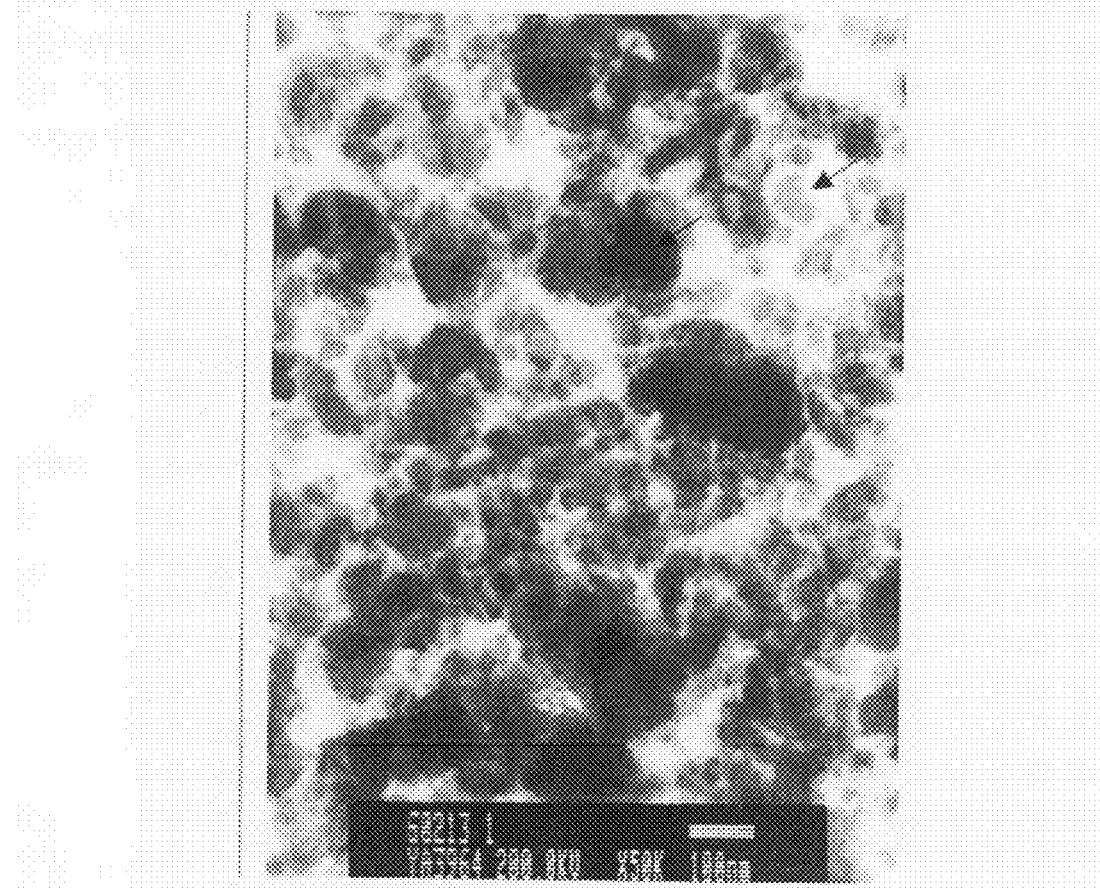
FIG. 31 is a TEM photograph showing the CeAg-additive component composition obtained in Example 5.

Further, the obtained CeAg—La10 was subjected to TEM observation. The obtained result is shown in FIG. 31. In FIG. 31, large particles like the one indicated by the arrow 1 are aggregates made of $CeO_2$ surrounding Ag, and small particles like the one indicated by the arrow 2 correspond to $CeO_2$ aggregates (particle diameter: approximately 30 nm). Since the void pore diameter corresponds to the size of the small particles, the void pores are mainly formed by the aggregates comprising $CeO_2$ particles. The average particle diameter of the $CeO_2$ measured by XRD was 13 nm; therefore, it was confirmed that the void pores were attributed to secondary particles (aggregates).

Figure 32:
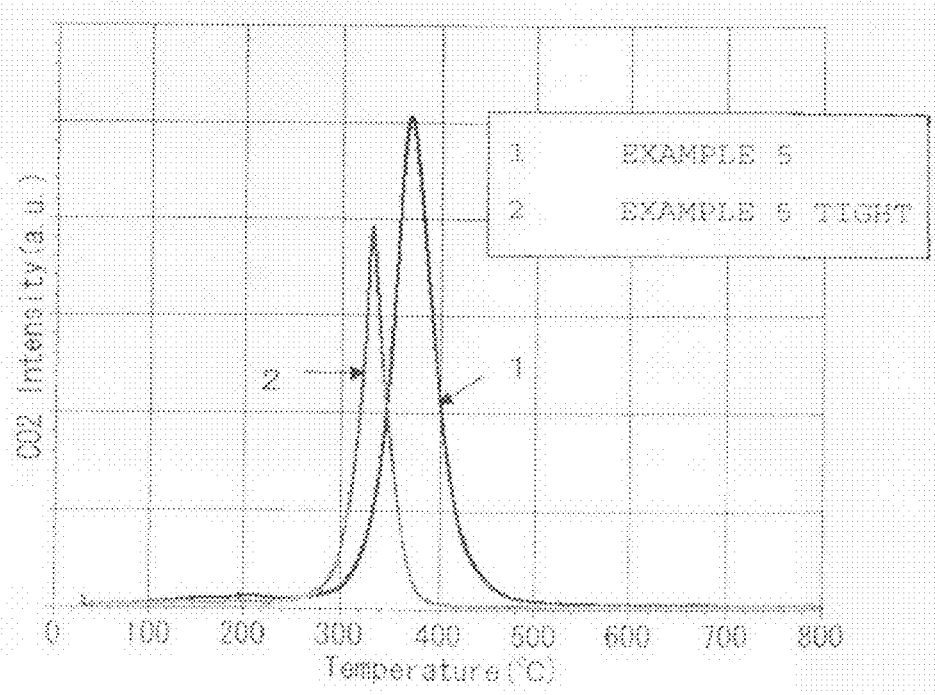
FIG. 32 is a graph showing results of $CO_2$ generation intensity evaluations using the CeAg-additive component composition obtained in Example 5.

Further, Sample 1 and Sample 2 were prepared using the obtained CeAg—La10 similarly to Example 1, and then were each subjected to the measurement of $CO_2$ generation intensity upon rise in temperature. The obtained results are shown in FIG. 32. Here, in the drawing, the result of Sample 1 is indicated as "1," the result of Sample 2 is indicated as "2." As apparent from the results shown in FIG. 32, in the case of CeAg—La10 of the present Example, Sample 1 that represented the "loose blending method" also achieved oxidation performance equivalent to that of Sample 2 that represented the "strong blending method." Therefore, it was confirmed that strong contact equivalent to that of Sample 2 was achieved as well in Sample 1.

Example 6

A $CeO_2$—Ag-additive component composition "CeAg—La10" (a structure having strong contact with solid particles) was obtained similarly to Example 5 except for adding nitric acid in an amount of 30 ml in the acid treatment and performing the stirring at 15° C. for 12 hours.

The content percentage of Ag in the obtained CeAg—La10 was evaluated similarly to Example 1, and found to be 16 mol % on a Ce+Ag basis. Here, the obtained CeAg—La10 was found to have a $CeO_2$ particle diameter of 12 nm and an Ag particle diameter of 28 nm.

Figure 33:
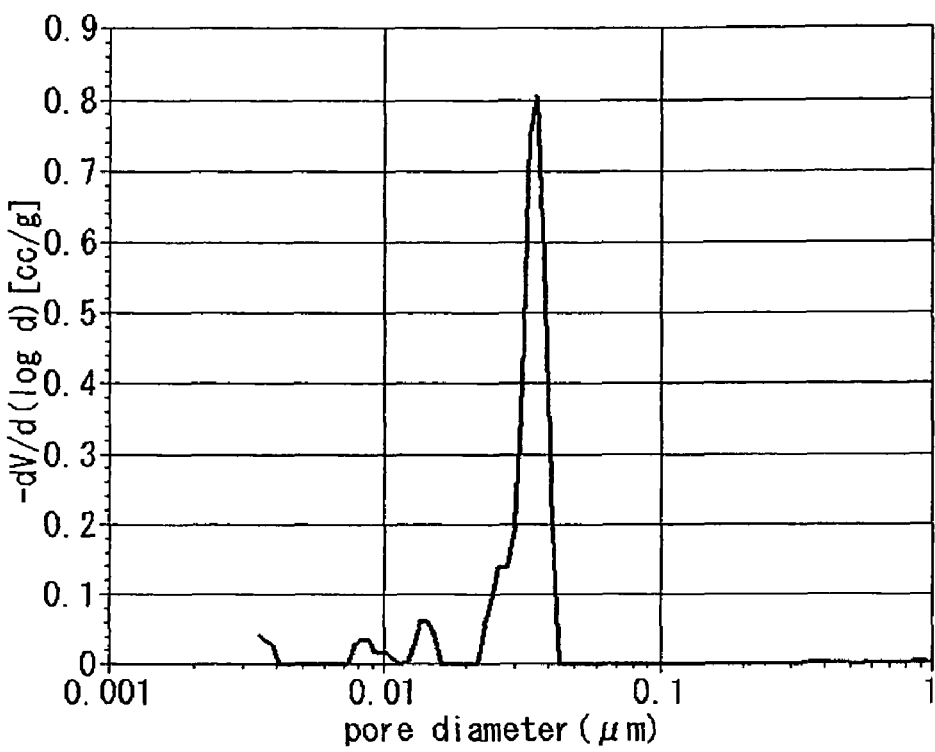
FIG. 33 is a graph showing pore diameter distribution of a CeAg-additive component composition obtained in Example 6.
Figure 34:
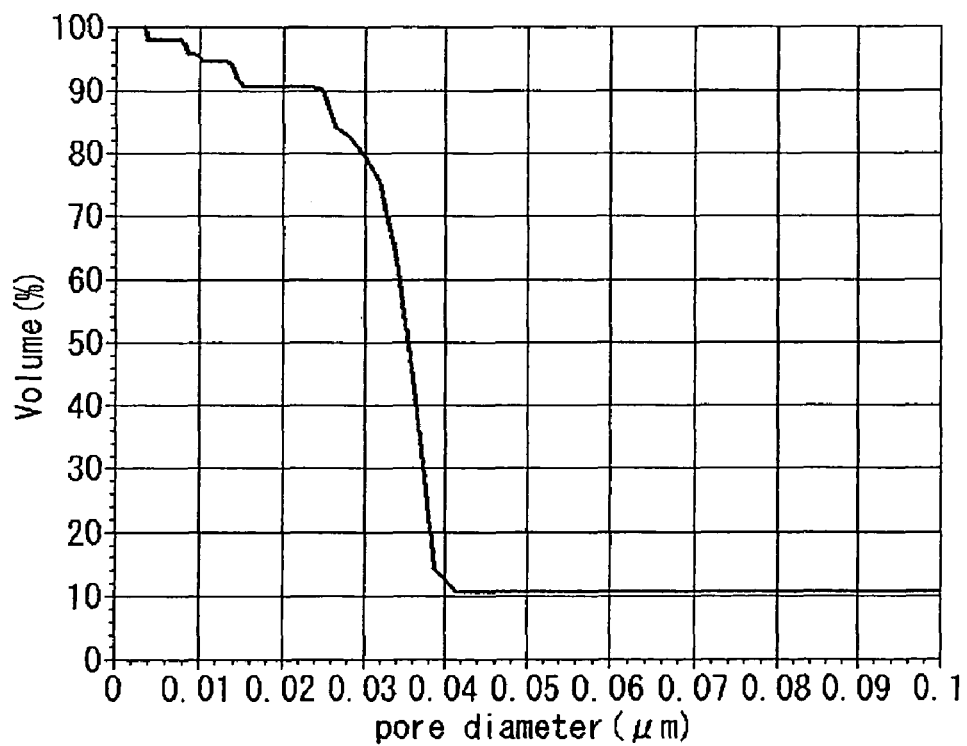
FIG. 34 is a graph showing pore diameter distribution (accumulated total) of the CeAg-additive component composition obtained in Example 6.

Further, the pore volume and pore diameter distribution of the obtained CeAg—La10 were measured similarly to Example 1. The obtained results are shown in FIG. 33 and FIG. 34 (FIG. 34 shows distribution of accumulated total volume). As a result, it was found that the volume of all the pores was 0.12 cc/g, and the volume of pores having pore diameters in a range from 0.01 to 1.0 μm was 0.10 cc/g. Here, the range of void pores formed by the aggregates was from 0.01 to 0.04 μm, and the average diameter of the void pores was 0.035 μm. Hence, according to the result shown in FIG. 34, it was confirmed that the volume of void pores having pore diameters in a range from 0.018 to 0.053 μm that represents the range within ±50% away from the average diameter of the void pores accounted for 80% of the total volume of the void pores. Moreover, it was also confirmed that the volume of pores having pore diameters in a range from 0.01 to 0.5 μm accounted for 85% of the volume of all the pores.

Figure 35:
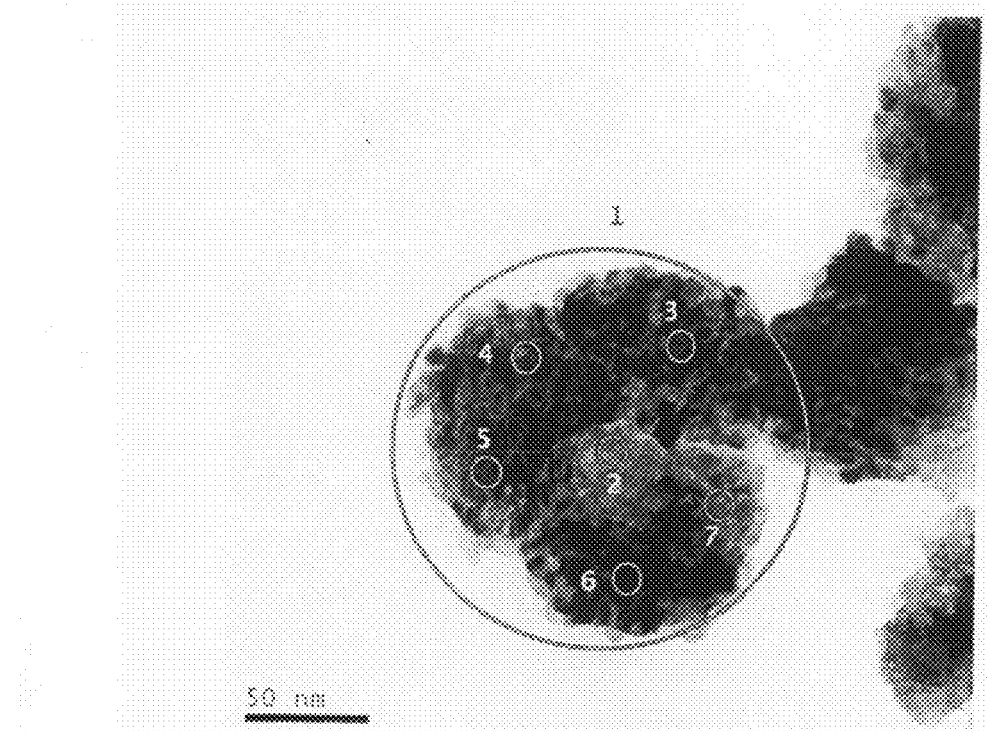
FIG. 35 is a TEM photograph showing the CeAg-additive component compositions obtained in Example 6.
Figure 36:
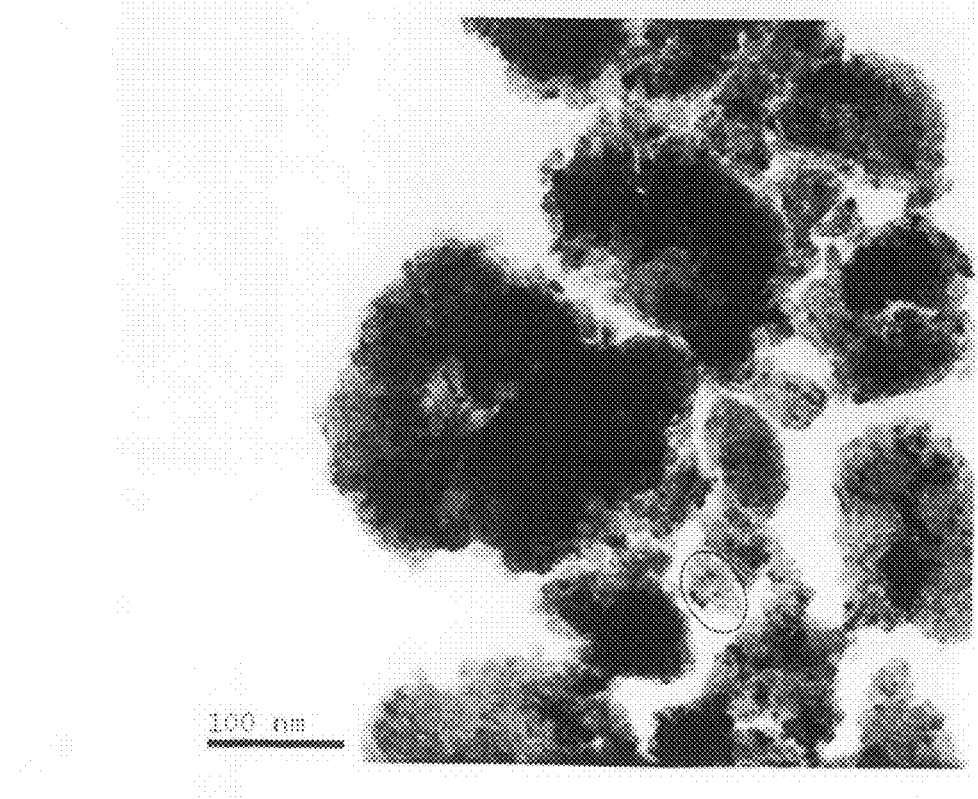
FIG. 36 is a TEM photograph showing the CeAg-additive component composition obtained in Example 6.

Further, the obtained CeAg—La10 was observed by TEM at high resolution. The obtained results are shown in FIG. 35 and FIG. 36. Spectra at measurement points (1 to 7) shown in FIG. 35 were obtained by the energy dispersive X-ray spectroscopy, and the numbers of counts of the contained components (Ce and Ag) were obtained to calculate elemental compositions at the respective measurement points. The contents of Ag were found to be 1: 14.15 mol %, 2: 16.52 mol %, 3: 7.93 mol %, 4: 11.73 mol %, 5: 14.51 mol %, 6: 13.58 mol %, and 7: 13.04 mol %. Although no Ag particle was detectable by the TEM in $CeO_2$ portions, these portions were proven to contain Ag. Therefore, it was confirmed that Ag ultrafine particles were also present on $CeO_2$. Here, small particles like the one circled in FIG. 36 correspond to $CeO_2$ aggregates (particle diameter: approximately 30 nm) that form the void pores.

Figure 37:
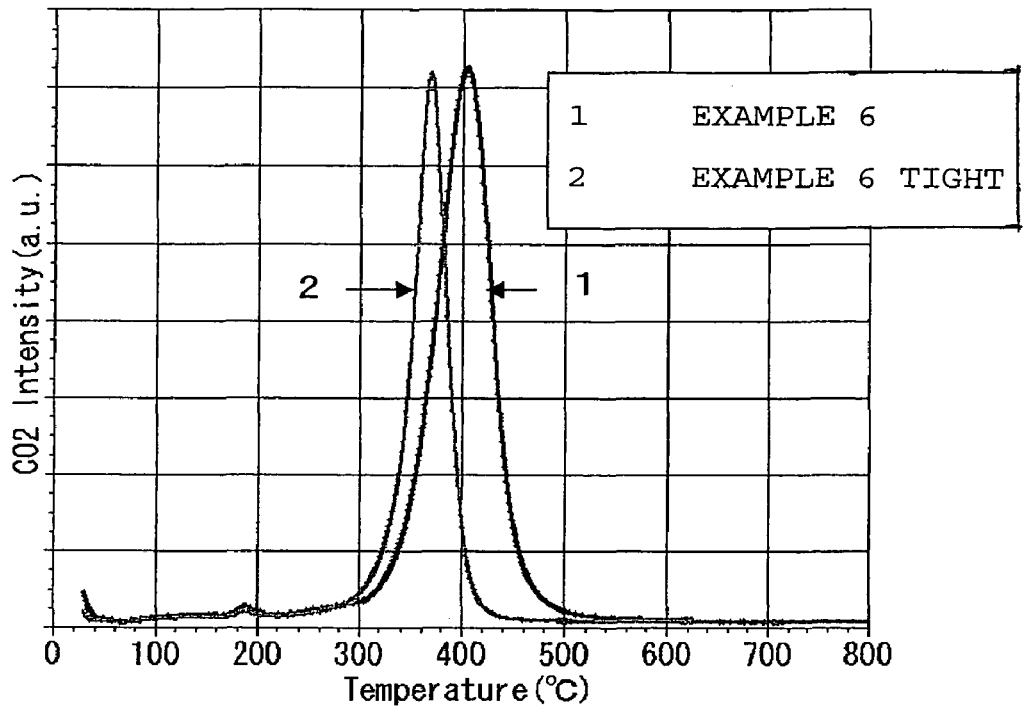
FIG. 37 is a graph showing results of $CO_2$ generation intensity evaluations using the CeAg-additive component composition obtained in Example 6.

Further, Sample 1 and Sample 2 were prepared using the obtained CeAg—La10 similarly to Example 1, and then were each subjected to the measurement of $CO_2$ generation intensity upon rise in temperature. The obtained results are shown in FIG. 37. Here, in the drawing, the result of Sample 1 is indicated as "1," and the result of Sample 2 is indicated as "2." As apparent from the results shown in FIG. 37, in the case of the CeAg—La10 of the present Example, Sample 1 that represented the "loose blending method" also achieved oxidation performance equivalent to that of Sample 2 that represented the "strong blending method." Therefore, it was confirmed that strong contact equivalent to that of Sample 2 was achieved as well in Sample 1.

Example 7

A CeO$_2$—Ag-additive component composition "CeAg—La10" (a structure having strong contact with solid particles) was obtained similarly to Example 3 except for using a solution which was prepared by dissolving 50.46 g of Ce(NO$_3$)$_3$·6H$_2$O, 5.59 g of La(NO$_3$)$_3$, and 29.62 g of AgNO$_3$ into 1500 mL of water and using ammonia water which was prepared by diluting 38.21 g of 25% ammonia water with 1500 g of water.

The content percentage of Ag in the obtained CeAg—La10 was evaluated similarly to Example 1, and found to be 48.2 mol % on a Ce+Ag basis. Here, the obtained CeAg—La10 was found to have a CeO$_2$ particle diameter of 11 nm and an Ag particle diameter of 25 nm.

Figure 38:
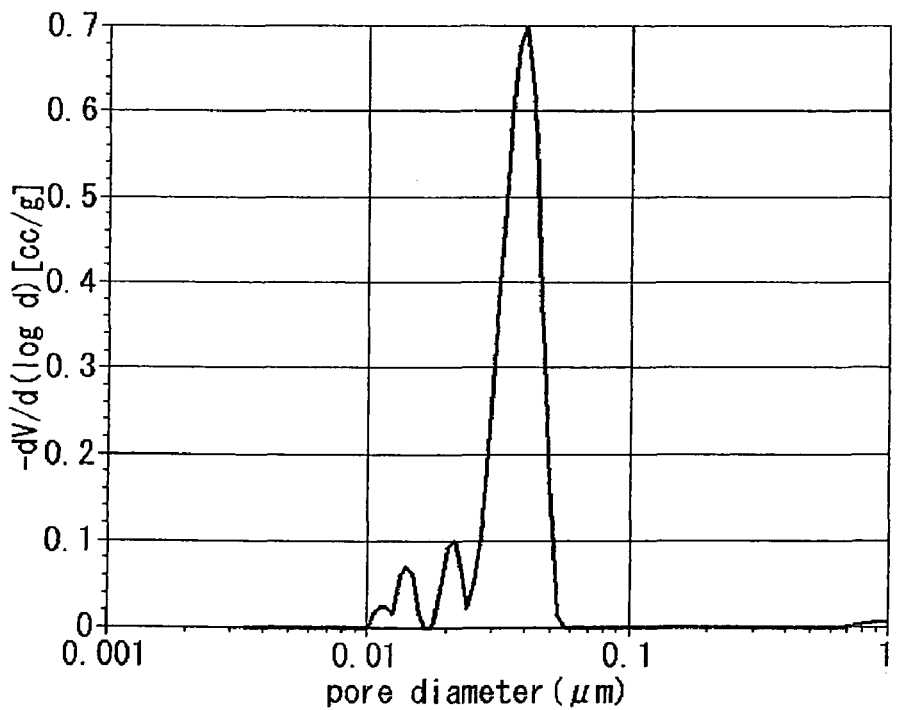
FIG. 38 is a graph showing pore diameter distribution of a CeAg-additive component composition obtained in Example 7.
Figure 39:
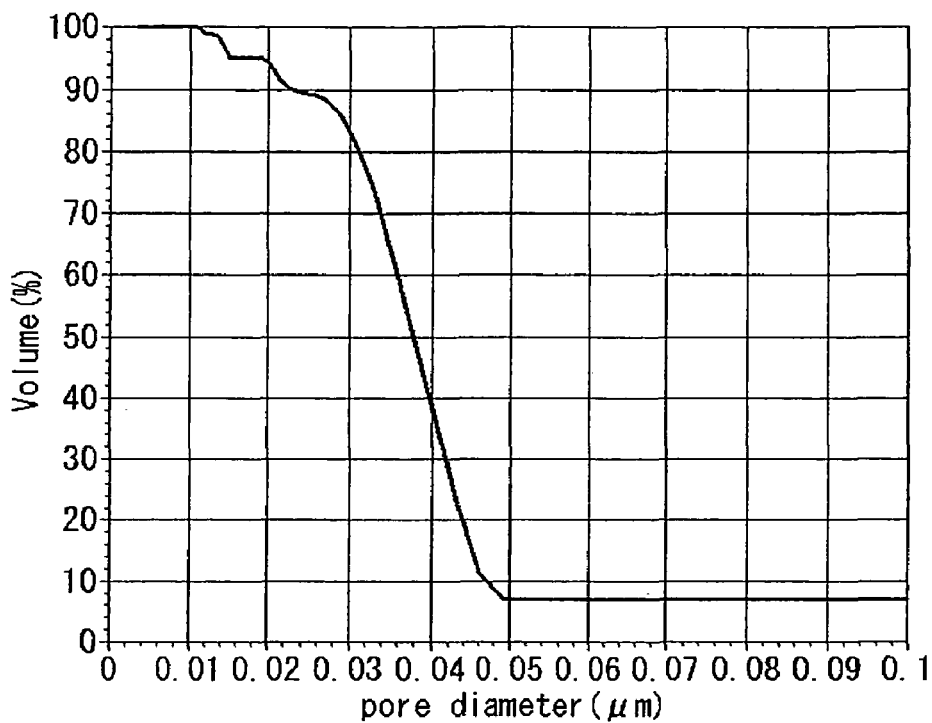
FIG. 39 is a graph showing pore diameter distribution (accumulated total) of the CeAg-additive component composition obtained in Example 7.

Here, the pore volume and pore diameter distribution of the obtained CeAg—La10 were measured similarly to Example 1. The obtained results are shown in FIG. 38 and FIG. 39 (FIG. 39 shows distribution of accumulated total volume). As a result, it was found that the volume of all the pores was 0.15 cc/g, and the volume of pores having pore diameters in a range from 0.01 to 1.0 μm was 0.14 cc/g. The range of void pores formed by the aggregates was from 0.01 to 0.05 μm, and the average diameter of the void pores was 0.037 μm. Hence, according to the results shown in FIG. 39, it was confirmed that the volume of void pores having pore diameters in a range from 0.019 to 0.056 μm that represents the range within ±50% away from the average diameter of the void pores accounted for 88% of the total volume of the void pores. Moreover, it was also confirmed that the volume of pores having pore diameters in a range from 0.01 to 0.5 μm accounted for 93% of the volume of all the pores.

Figure 40:
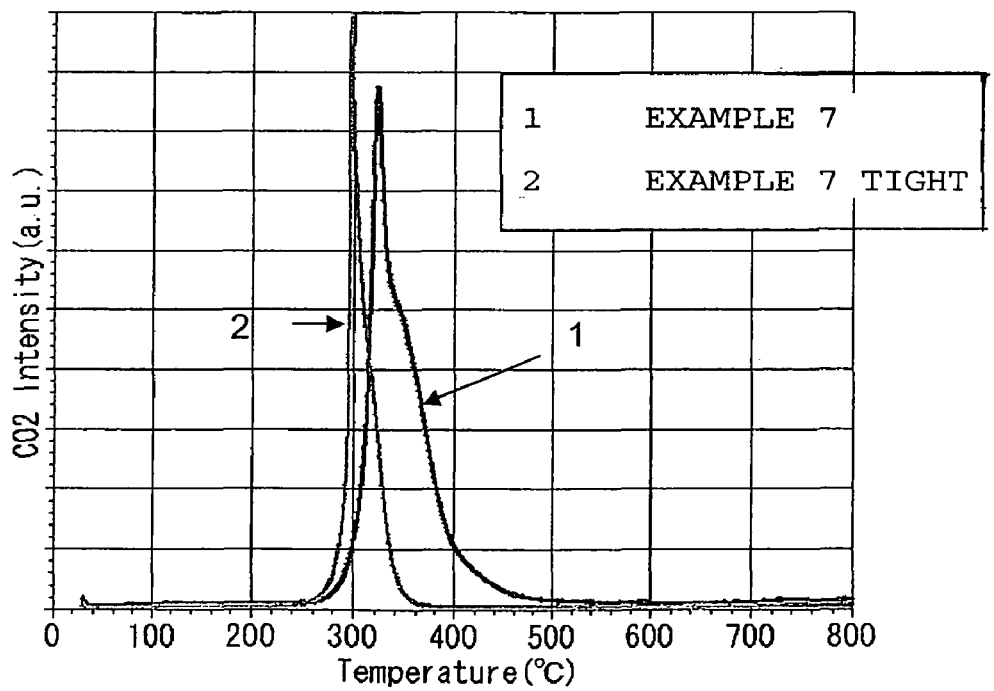
FIG. 40 is a graph showing results of $CO_2$ generation intensity evaluations using the CeAg-additive component compositions obtained in Example 7.

Further, Sample 1 and Sample 2 were prepared using the obtained CeAg—La10 similarly to Example 1, and then were each subjected to the measurement of CO$_2$ generation intensity upon rise in temperature. The obtained results are shown in FIG. 40. Here, in the drawing, the result of Sample 1 is indicated as "1," and the result of Sample 2 is indicated as "2." As apparent from the results shown in FIG. 40, in the case of the CeAg—La10 of the present Example, Sample 1 that represented the "loose blending method" achieved oxidation performance equivalent to that of Sample 2 that represented the "strong blending method." Therefore, it was confirmed that strong contact equivalent to that of Sample 2 was achieved as well in Sample 1.

Example 8

A CeO$_2$—Ag-additive component composition "CeAg—La20" (a structure having strong contact with solid particles) was obtained similarly to Example 3 except for: using a solution which was prepared by dissolving 50.49 g of Ce(NO$_3$)$_3$·6H$_2$O, 12.59 g of La(NO$_3$)$_3$, and 8.47 g of AgNO$_3$ into 120 mL of water; using ammonia water which was prepared by diluting 12.0 g of 25% ammonia water with 100 g of water; and setting the stirring time after the blending to 1 minute and the aggregation treatment time to 30 minutes.

The content percentage of Ag in the obtained CeAg—La20 was evaluated similarly to Example 1, and found to be 48.2 mol % on a Ce+Ag basis. Here, the obtained CeAg—La20 was found to have a CeO$_2$ particle diameter of 13 nm and an Ag particle diameter of 25 nm.

Figure 41:
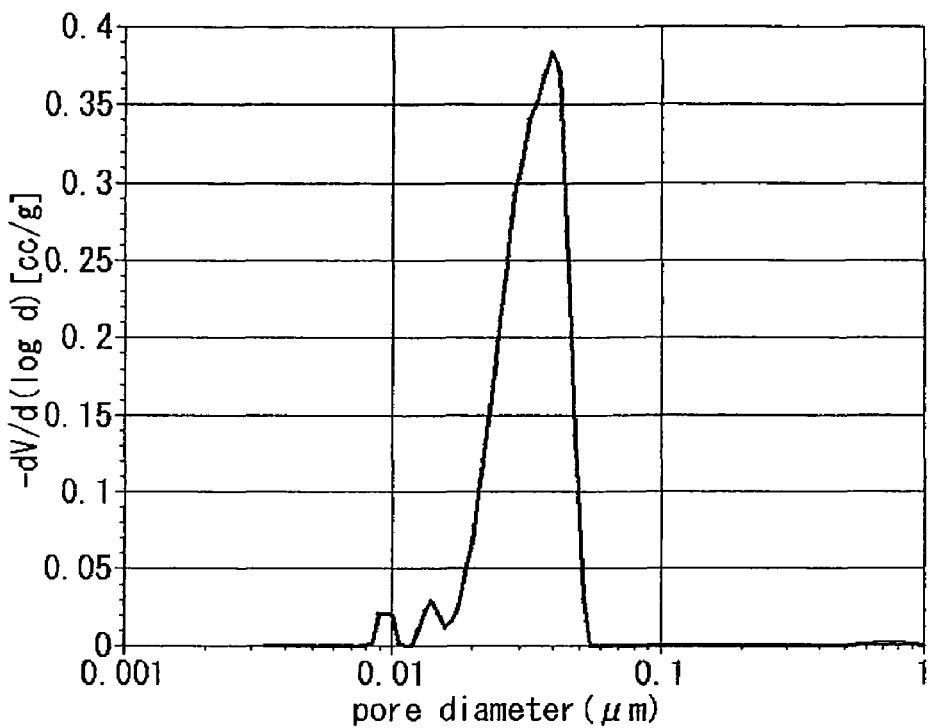
FIG. 41 is a graph showing pore diameter distribution of a CeAg-additive component composition obtained in Example 8.
Figure 42:
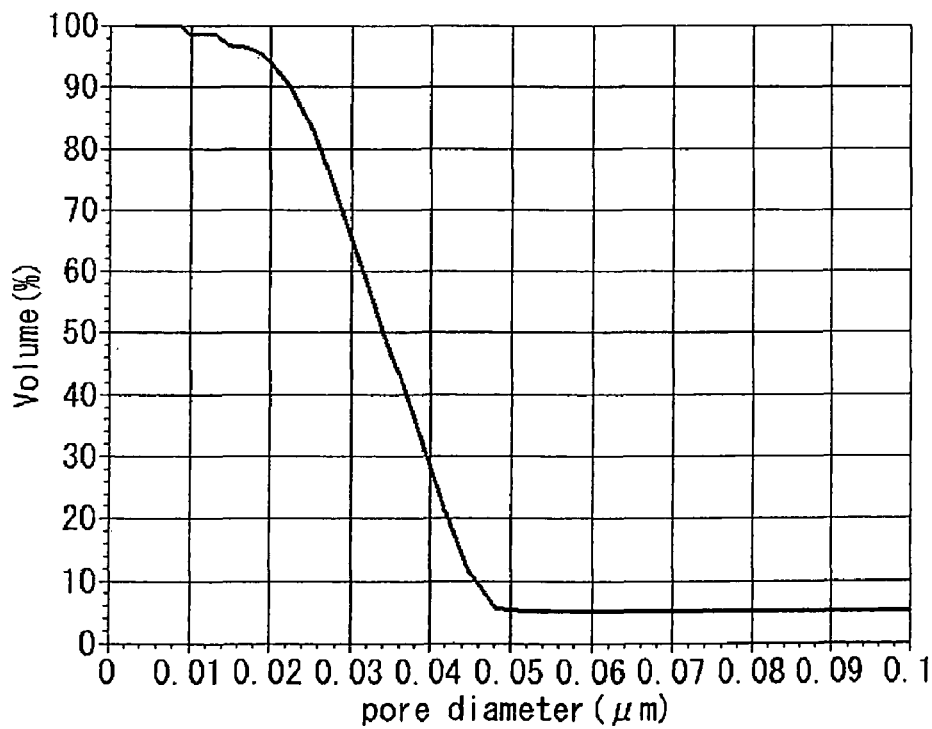
FIG. 42 is a graph showing pore diameter distribution (accumulated total) of the CeAg-additive component composition obtained in Example 8.

Here, the pore volume and pore diameter distribution of the obtained CeAg—La20 were measured similarly to Example 1. The obtained results are shown in FIG. 41 and FIG. 42 (FIG. 42 shows distribution of accumulated total volume). As a result, it was found that the volume of all the pores was 0.12 cc/g, and the volume of pores having pore diameters in a range from 0.01 to 1.0 μm was 0.11 cc/g. The range of void pores formed by the aggregates was from 0.01 to 0.05 μm, and the average diameter of the void pores was 0.034 μm. Hence, according to the results shown in FIG. 42, it was confirmed that the volume of void pores having pore diameters in a range from 0.017 to 0.051 μm that represents the range within ±50% away from the average diameter of the void pores accounted for 88% of the total volume of the void pores. Moreover, it was also confirmed that the volume of pores having pore diameters in a range from 0.01 to 0.5 μm accounted for 90% of the volume of all the pores.

Figure 43:
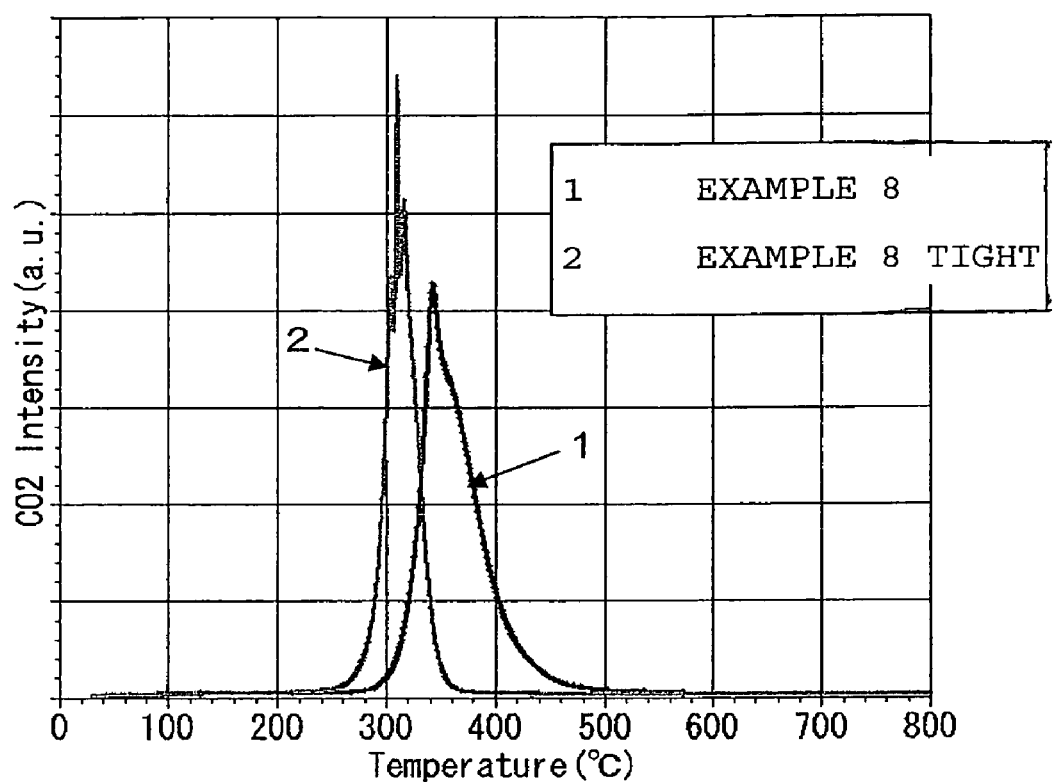
FIG. 43 is a graph showing results of $CO_2$ generation intensity evaluations using the CeAg-additive component composition obtained in Example 8.

Further, Sample 1 and Sample 2 were prepared using the obtained CeAg—La20 similarly to Example 1, and then were each subjected to the measurement of CO$_2$ generation intensity upon rise in temperature. The obtained results are shown in FIG. 43. Here, in the drawing, the result of Sample 1 is indicated as "1," and the result of Sample 2 is indicated as "2." As apparent from the results shown in FIG. 43, in the case of the CeAg—La20 of the present Example, Sample 1 that represented the "loose blending method" also achieved oxidation performance equivalent to that of Sample 2 that represented the "strong blending method." Therefore, it was confirmed that strong contact equivalent to that of Sample 2 was achieved as well in Sample 1.

INDUSTRIAL APPLICABILITY

As described above, according to the present invention, it is possible to provide: a structure having strong contact with solid particles, which is capable of efficiently trapping a wide range of solid particles, including carbon-containing components such as soot and PMs having small particle diameters, and extremely useful as an oxidation catalyst and the like; and a substrate having strong contact with solid particles using the same. Furthermore, according to the present invention, it is possible to efficiently and surely obtain the structure having strong contact with solid particles and the substrate having strong contact with solid particles using the structure having strong contact with solid particles.

Hence, the present invention is extremely useful as a technique concerning a structure having strong contact with solid particles which is useful as an oxidation catalyst and the like, the technique being applicable to means for removing PM components in exhaust gas, means for preventing insulation breakdown of an insulator and the like attributable to attachment of carbonaceous matter thereto, means for preventing coking in a reforming catalyst, and partial oxidation of hydrocarbons, such as partial oxidation of ethylene into ethylene epoxide.

The invention claimed is:

1. A structure having strong contact with solid particles, comprising:
   an assembly formed by secondary aggregation which is further aggregation of aggregates each formed by primary aggregation of primary particles each made of a metal and/or a metal oxide, wherein
   an average primary particle diameter of the primary particles is in a range from 1 to 100 nm,
   an average particle diameter of the aggregates is in a range from 0.01 to 0.5 μm, and
   among void pores formed by the aggregates, a volume of void pores having pore diameters in a range within ±50% away from an average void pore diameter of the void pores is equal to or above 60% of a total volume of the void pores.

2. The structure having strong contact with solid particles according to claim 1, wherein a volume of pores having pore diameters in a range from 0.01 to 0.5 μm in the assembly accounts for 20 to 99% of a total volume of the pores in the assembly.

3. The structure having strong contact with solid particles according to claim 1, wherein a volume of pores having pore diameters in a range from 0.01 to 1.0 μm in the assembly is in a range from 0.05 to 1.0 cc/g.

4. The structure having strong contact with solid particles according to claim 1, wherein
an average particle diameter of the aggregates is in a range from 0.01 to 0.5 μm, and
a portion equal to or above 60% by volume of all the aggregates has particle diameters in a range within ±50% away from the average particle diameter.

5. The structure having strong contact with solid particles according to claim 1, wherein the primary particles each contain at least one substance selected from the group consisting of: oxides of La, Ce, Pr, Nd, Pm, Sm, Eu, Gd, Tb, Dy, Ho, Er, Tm, Yb, Lu, Y, Zr, Fe, Ti, Al, Mg, Co, Ni, Mn, Cr, Mo, W, and V; solid solutions thereof; and composite oxides thereof.

6. The structure having strong contact with solid particles according to claim 5, further comprising metal ultrafine particles supported on the surfaces of the primary particles.

7. The structure having strong contact with solid particles according to claim 1, comprising, as the aggregates, aggregates each made of a first metal particle constituting a core and second metal oxide particulates surrounding the first metal particle.

8. The structure having strong contact with solid particles according to claim 7, wherein
a first metal constituting the first metal particle has an ionization tendency equal to or smaller than the ionization tendency of Zn, and
a second metal constituting the second metal oxide particulates is a metal with variable valences.

9. The structure having strong contact with solid particles according to claim 7, wherein
the first metal particle is an oxygen-extracting particle made of an oxygen-extracting material which is configured to extract at least oxygen from an oxygen-containing substance to generate an oxygen-reactive-species, and
the individual second metal oxide particulates are an oxygen-reactive-species transporting particle made of an oxygen-reactive-species transporting material which is capable of transporting the oxygen-reactive-species generated by the oxygen-extracting material.

10. The structure having strong contact with solid particles according to claim 9, wherein
the oxygen-extracting material contains Ag, and
the oxygen-reactive-species transporting material is a composite oxide containing any one of $CeO_2$ and Ce.

11. The structure having strong contact with solid particles according to claim 1, wherein the structure having strong contact with solid particles is an oxidation catalyst.

12. A substrate having strong contact with solid particles, comprising:
a substrate; and
the structure having strong contact with solid particles according to claim 1.

13. The substrate having strong contact with solid particles according to claim 12, wherein
the substrate has pores ranging from 1 to 300 μm; and
a coating layer having an average thickness equivalent to 0.5 to 50 times as large as the average particle diameter of the aggregate is formed inside the pores by the structure having strong contact with solid particles.

14. The substrate having strong contact with solid particles according to claim 12, wherein
a proportion of the void pores in the structure having strong contact with solid particles among all of the pores contained in the substrate having strong contact with solid particles is in a range from 1 to 50% by volume.

15. The substrate having strong contact with solid particles according to claim 12, used as a substrate for purification of exhaust gas.

16. A fluid dispersion of a structure having strong contact with solid particles, containing:
the aggregate according to claim 1; and
a disperse medium.

17. A method of manufacturing a substrate having strong contact with solid particles, wherein a substrate having strong contact with solid particles is obtained by causing the fluid dispersion of a structure having strong contact with solid particles according to claim 16 to contact the substrate, followed by calcination.

18. A method of manufacturing a structure having strong contact with solid particles, comprising the steps of:
generating an aggregate precursor out of a solution containing a first metal salt and a second metal salt such that a first metal particle derived from the first metal salt is surrounded by second metal compound particulates derived from the second metal salt; and
by calcining the obtained aggregate precursor, obtaining a structure having strong contact with solid particles including an assembly formed by secondary aggregation which is further aggregation of aggregates each made of the first metal particle constituting a core and second metal oxide particulates surrounding the first metal particle, wherein
an average primary particle diameter of the first metal particle and the second metal oxide particulates is in a range from 1 to 100 nm, and,
among void pores formed by the aggregates, a volume of void pores having pore diameters in a range within ±50% away from an average void pore diameter of the void pores is equal to or above 60% of a total volume of the void pores.

19. The method of manufacturing a structure having strong contact with solid particles according to claim 18, wherein, in the step of generating an aggregate precursor, the aggregate precursor is generated by generating the second metal compound particulates under the presence of a pH adjuster and depositing the first metal particle by a reduction action of the second metal compound particulates.

20. The method of manufacturing a structure having strong contact with solid particles according to claim 19, wherein, in the step of generating an aggregate precursor, the first metal particle is deposited by generating a first metal compound derived from the first metal salt under the presence of a complexing agent, and then reducing the first metal compound by a reduction action of the second metal compound particulates.

21. The method of manufacturing a structure having strong contact with solid particles according to claim 18, wherein the first metal salt is a salt of a metal having an ionization tendency equal to or smaller than the ionization tendency of Zn, and the second metal salt is a salt of a metal with variable valences.

22. The method of manufacturing a structure having strong contact with solid particles according to claim 18, wherein the first metal particle is an oxygen-extracting particle made of an oxygen-extracting material which is configured to extract at least oxygen from an oxygen-containing substance to generate an oxygen-reactive-species, and the individual second metal oxide particulates are an oxygen-reactive-species transporting particle made of an oxygen-reactive-species transporting material which is capable of transporting the oxygen-reactive-species generated by the oxygen-extracting material.

23. The method of manufacturing a structure having strong contact with solid particles according to claim 22, wherein the first metal salt serving as a starting material of the oxygen-extracting material contains Ag, and the second metal salt serving as a starting material of the oxygen-reactive-species transporting material contains a salt of Ce.

24. The method of manufacturing a structure having strong contact with solid particles according to claim 18, wherein an average particle diameter of the aggregate precursor is in a range from 0.01 to 0.5 μm, and a portion equal to or above 60% by volume of all the aggregate precursors has particle diameters in a range within ±50% away from the average particle diameter.

25. The method of manufacturing a structure having strong contact with solid particles according to claim 18, wherein the structure having strong contact with solid particles is an oxidation catalyst.

26. A fluid dispersion of a structure having strong contact with solid particles, containing:

the aggregate precursor obtained in the process of the method of manufacturing the structure having strong contact with solid particles according to claim 18; and a disperse medium.

27. A method of manufacturing a substrate having strong contact with solid particles, wherein a substrate having strong contact with solid particles is obtained by causing the fluid dispersion of a structure having strong contact with solid particles according to claim 26 to contact the substrate, followed by calcination.

* * * * *